(12) United States Patent
Steiner et al.

(10) Patent No.: US 9,930,179 B2
(45) Date of Patent: Mar. 27, 2018

(54) MECHANISM FOR WORK ASSIGNMENT IN A GRAPH-BASED CONTACT CENTER

(71) Applicant: Avaya Inc., Basking Ridge, NJ (US)

(72) Inventors: Robert C. Steiner, Broomfield, CO (US); Wen-Hua Ju, Monmouth Junction, NJ (US)

(73) Assignee: Avaya Inc., Basking Ridge, NJ (US)

( * ) Notice: Subject to any disclaimer, the term of this patent is extended or adjusted under 35 U.S.C. 154(b) by 220 days.

(21) Appl. No.: 14/290,654

(22) Filed: May 29, 2014

(65) Prior Publication Data

US 2015/0350440 A1     Dec. 3, 2015

(51) Int. Cl.
H04M 3/523 (2006.01)
H04M 3/51 (2006.01)
G06Q 30/00 (2012.01)
H04M 3/493 (2006.01)

(52) U.S. Cl.
CPC ........ H04M 3/5232 (2013.01); G06Q 30/016 (2013.01); H04M 3/493 (2013.01)

(58) Field of Classification Search
CPC .. H04M 3/5175; H04M 3/523; H04M 3/5232; G06Q 10/10; G06Q 10/00; G06F 17/30958
USPC ............ 379/265.01–265.02, 266.01, 266.02; 715/700; 707/999.1, 798
See application file for complete search history.

(56) References Cited

U.S. PATENT DOCUMENTS

| | | | |
|---|---|---|---|
| 8,619,968 B2 | 12/2013 | Flockhart et al. | |
| 8,634,543 B2 | 1/2014 | Flockhart et al. | |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2012/0321059 A1* | 12/2012 | O'Connor | G06Q 10/06 379/93.21 |
| 2014/0355750 A1* | 12/2014 | Chan | H04M 3/5175 379/265.05 |
| 2015/0058363 A1* | 2/2015 | Lancer | G06F 17/30961 707/749 |

OTHER PUBLICATIONS

U.S. Appl. No. 14/290,650, filed May 29, 2014, Steiner et al.

* cited by examiner

*Primary Examiner* — Rasha Al Aubaidi
(74) *Attorney, Agent, or Firm* — Sheridan Ross P.C.

(57) ABSTRACT

A graph database is described for use in connection with a contact center. The graph database includes a plurality of nodes and relationships that describe the operations, entities, personnel, and attributes in the contact center. Also described is the operation of a work assignment engine that leverages the graph database to make intelligent and flexible work assignment decisions.

20 Claims, 20 Drawing Sheets

MECHANISM FOR WORK ASSIGNMENT IN A GRAPH-BASED CONTACT CENTER

FIELD OF THE DISCLOSURE

The present disclosure is generally directed toward communications and more specifically toward contact centers.

BACKGROUND

Contact centers originally developed as an analogy to a customer service line. In particular, queue theory has dominated the development of contact centers to date.

Within the last several years, however, significant advances in contact center architecture have been made and movement away from a traditional work/agent queue has developed. One example of such a contact center is described in U.S. Pat. No. 8,619,968, the entire contents of which are hereby incorporated herein by reference. This implementation of the queueless contact center represented a brand new way of thinking about contact centers and how they should be constructed. Through the development of the queueless contact center, some obstacles have been identified and, in most situations, overcome. In general, there are significant advantages to implementing a queueless contact center.

At its core, however, the queueless contact center is still dependent upon a large number of discrete modules and systems interconnecting and communicating with one another. Specifically, the work assignment engine is separate from the Customer Relationship Management (CRM) system, which are both separate from Work Force Management (WFM) systems. The work assignment engine is also separate from, Work-Flow (front and back-office), Voice Portal and other interactive voice response (IVR) systems as well as additional reporting and forecasting systems.

A primary problem with existing contact center solutions is that they do not provide a clean or easy way to have the above-mentioned contact center components interoperate. Another problem with the movement away from traditional queue-based contact centers is that the rigid structure of the queue naturally limited the type of data that was considered interesting for purposes of work assignment, reporting, etc. Thus, without the existence of a queue, the amount of data associated with work items and agents (e.g., attributes) has expanded exponentially. Current contact center databases do not easily support the creation of attribute sets (e.g., a set of attributes describing a particular work item or agent). In fact, the contact center database has been manually updated to support each new attribute set or possible attribute set. As a single attribute is added to the contact center, the possible number of attribute sets multiplies. This data expansion severely pushes the limits of current database structures used in contact centers.

What is needed is a more comprehensive solution for developing a contact center, whether queueless or queue-based. In particular, a completely new model is needed to enable the next quantum leap in contact center development.

SUMMARY

It is, therefore, one aspect of the present disclosure to introduce a new model for use in a contact center. Specifically, embodiments of the present disclosure propose the utilization of a graph database to replace the traditional hierarchical databases used in contact centers to date, whether queue-based or queueless.

It is one aspect of the present disclosure to enable a contact center to share a common data structure that better describes the state of the contact center and components therein and extends easily to new and different concepts like goal management, process control, analytics, and context-rich work assignment. The new model proposed herein is a graph and a graph-based framework (e.g., a graph database) with scalable, durable and cost-effective modeling of the entire contact center is proposed. This model allows easy integration of work assignment, administration, reporting, process control, and media management without translation to component-specific models. Not only does this make the information from the graph database easily available to every contact center subsystem, but the graph database is highly scalable and capable of supporting small, medium, and large contact center installations with ease.

In accordance with at least some embodiments, a graph database describes everything stored therein using nodes and relationships. The nodes can be anything of interest, including but not limited to an attribute (e.g., characteristic or feature of a resource, work item, etc.), a resource itself, a work item itself, a result, a measure, an interaction or conference that occurred between nodes, etc.

One aspect of the graph database is to support an attribute tree. An attribute is a character, quality, processing requirement, and/or feature of an entity. Examples of attributes might include language preference, age, product information (e.g., SALE-FURNITURE), and other demographics. Attributes are commonly considered for routing decisions by a work assignment engine to best meet goals and/or desired metrics for a contact center. Current systems often require grouping the attributes into sets for matching and reporting. The present disclosure, on the other hand, will use the attribute tree directly for matching, thereby eliminating the attribute set and allowing the naturally defined relationships to provide simple proximity determination.

As an example, by using an attribute tree during work assignment, a request for ENGLISH by a work item could be satisfied by ENGLISH-UK or ENGLISH-US or a request for ENGLISH-UK can be handled by ENGLISH-US (e.g., because the graph database describes the relationship, both UK and US English are children of ENGLISH) but at a slight cost or is nearly the same or is better than other choices.

Embodiments of the present disclosure allow the new framework to move up and down the graph for close matches, so the relationship between nodes is important. Routing decisions may be made based on closeness to a target attribute within the attribute tree. Reporting and administration can use the tree to "roll-up" and "drill-down."

Another aspect of the present disclosure is to utilize a weighting system to determine costs for moving up and down the tree, and these weights can be considered during work assignment decisions. Adjustments can be made at any level of the attribute tree, using the mechanism to move up and down the graph. The proposed disclosure removes the need for multiple attribute sets and attribute set exclusion. Reporting also becomes extremely simple. A natural roll up and drill down graph is provided.

In an example, if a work item comes in that requires attributes of English, Sales, Existing Customer, CableTV, and Premium, can Agent 2 do any or all of it? Can Agent 3 do it now rather than the system waiting for Agent 2, even though Agent 3 normally only handles Regular and not Premium customers? If the only option for ten minutes is Agent 4 who only speaks Spanish, is that a viable option? At what cost? Within the graph, closeness would be considered as a weighted goal as well as relative closeness with branching, depending on the cost. Decisions could be made for best-match, closest-match, and better-than-having-it-abandon match.

Extending the graph model enables adding new nodes and relationships, which is uncomplicated. There is no prior defined schema. The graph can represent static relationships (e.g., attributes) and dynamic relationships like call history, agent preferences, process steps, goals, costs, benefits and state. By walking the graph, the system can compute the costs and the benefits of decisions, not only in work assignment but in process control and work flow. By using a common data structure (e.g., a graph database), the same principles that are used for work assignment can be extended into other decision areas, allowing for a common work assignment decision engine to be used and further reducing the complexity and redundancy of the contact center.

In some embodiments, a graph database is used for the domain model. It represents the entire system, real-time, historical, matching, deployment, workflow, and administration. This database consists of nodes (e.g., vertices) connected together by relationships (e.g., edges). In some embodiments, each node can have properties and each relationship can have properties. The properties can have a name like handled and have a time-stamp and duration like @T9,1 to indicate when they are placed on the relationship/node. This mechanism provides a simple way to time-order the events (e.g., changes to properties and relationships) for analysis.

An initial implementation of the graph can be very simple. There can be three classes that form the basic graph. In some embodiments, both node and relationship can derive from the element class that has the property set. When connecting instances of these classes, the relationship between two entities (e.g., nodes) can be added to both the "To" and "From" node relationship collections. In this way, the graph can be walked in either direction. For efficiency, name of nodes and property names can be stored as integers and in a common symbol table. Having a symbol table improves efficiency of search and lookup by name, but does require the symbol table be instantiated across computational instances in a High Availability (HA) grid.

In some embodiments, a single reporting system can report on all of the discrete and different traditional components, including information from the IVR, the work assignment engine, CRM, WFM, media control, forecasting, workflow, etc. based on the new graph model capabilities.

In some embodiments, every piece of a workflow requests a work assignment decision to add a resource to a node during processing. Where work assignment was traditionally used for resource selection, now all parts of the graph are included in the workflow. Each node in the workflow graph can include a resource, and tasks of workflow are completed by the resource.

In some embodiments, the relationships of the graph database have properties. If these relationships were modeled in a relational database as another table with foreign keys to the "node tables", then every unique set of properties attached to a relationship would require creation of another table and modification of the relational database to object models used by the software. This can get extremely expensive and complex when there are thousands of property sets.

A benefit obtained by using a graph database instead of a relational database is expandability. Creating a new relationship in a graph database, as opposed to a relational database, is simple and fast. In a relational database, the schema must be changed (new tables if new relationship properties), new keys added, and the data migrated.

A useful value of a graph database for a contact center is that the workflow model, the historical, the real-time and the work-assignment models can be unified without having to do conversions to and from a RDB. This simplifies implementation, maintenance, and improves robustness. Another value here is that the core components of the contact center (e.g., Work-Flow, Reporting, Work-Assignment and Control) can work directly on the model in memory. This makes scripting an order of magnitude simpler to implement since there is no database management required.

For example, to add a new relationship is simply an "Add relationship with properties" operation. In the current scripting world, this requires coordinating the modification with a relational database change then adding the new tables and adding keys to the nodes being connected. It gets even worse if the relationship spans many node types (a node type would be represented by a table, e.g., a contact), since each table would have to be modified to have keys to the other nodes that can be on the other end. There are ways to do this generically, but they suffer by requiring complex joins to do even simple queries.

Another aspect of the present disclosure is to provide a mechanism for reporting on multi-dimensional conflicting metrics to provide a visual performance model. The goal is to provide a region-based color-coded mapping of measures as a single, visual output.

Another aspect of the present disclosure is to allow multiple metrics to be modeled into nine regions (or potentially into 27 regions in a 3-D map), where one color represents over-served, another color represents ok, another color represents marginal, and another color represents a serious problem. If a region is red, for example, that may indicate that both (in a two-dimensional map) or all (in a three-dimensional map) measures are in trouble. Ranges/thresholds (e.g., 20-40 seconds for abandonment) may be set by an administrator for each of the metrics represented as well as for groups and aggregates of metrics. The metrics can additionally be collected for reporting and documentation purposes.

The display metric chart may be divided into nine regions based on the conflicting metrics, and each of the regions can be mapped to an action. The administrator can build an algorithmic set (20-30 good algorithms) designed to change the contact center behavior based on the state of the regions.

In a non-limiting example, if service level is Measure A and abandon rate is Measure B, and the region where the two converge goes red, the system may automatically bring in reserve agents. Each region would be mapped to manage the relationships based on a simple model, with mapping each to the impact of what changes. Another example of a conflicting pair might be money/cost with a region to characterize the metric pair. The display can also indicate when many metrics are affected through the color illustration. Corrective actions may also be displayed when automatic actions are taken and alerts may be sent to agents, groups, and administrators. In addition, the regional map may include an identification of complementary metrics and conflicting metrics, or only complementary metrics, each with algorithms to change contact center behavior based on the status of the regions.

It is another aspect of the present disclosure to provide a mechanism for setting parameters and fine-tuning goals in a contact center. The goal is to provide a slider for each goal in the user interface that gives a simple mechanism to modify goals at a macro level, even goals that contain multiple measures.

Such a feature provides the administrator with the ability to make macro-level changes for goals in a new user interface. The slider bands may be moved back and forth to make adjustments (minor and major). These are the levers used to tune the behavior of the contact center.

In a non-limiting example, four sliders are provided to the administrator to adjust goals with multiple metrics: (a) Sales/First Time: 0-2% AB, 95-100% in 20 sec. SL; (b) Sales/Existing: 0-5% AB, 80-100% in 30 sec. SL; (c) Disconnect+Internet: 1-2% AB, 95-100% in 20 sec. SL; and (d) Trouble: 5-10% AB, 60-90% in 60 sec. SL In an additional embodiment, the administrator might be provided additional and/or different sliders to change critical measures like service level objective (SLO). Alternatively or additionally, changes in one or more goals may automatically change the slider position of other goals based on the relationships between the goals. In a non-limiting example, if Goal A is adjusted to a level where additional resources will be moved to cover the change, resources may also be affected for Goal B. Goal B may have fewer resources since the resources are now being used to support Goal A. Goal B's slider can automatically move up or down when Goal A is adjusted so that each goal is still within range of how it is expected to actually perform. Based on the dependencies and relationships between the goals, changing one goal may not affect other goals, may change one other goal, or may change multiple goals, where each affected goal may move a little or display significant movement.

It is another aspect of the present disclosure to provide a goal model that defines a tree, nodes, and relationships capable of handling complex queries to manage multiple administrable goals with associated metrics and targets.

A goal is a motivation which can be abstract or concrete, like meet my contract or 10% sales increase. For each goal, metric groups can be established to indicate goal achievement. Measures may be used to indicate results relative to goals (e.g., how to compute, variables, cost, benefit), including a target range for each metric and/or metric group. A hierarchy may be established which can be used to drive the operation of the primary components of the contact center (primary components: work assignment, administration, staffing, reporting, control systems, endpoints, IVR, voice portal, email system, social media systems (orchestration), collaboration tools (e.g., conferencing utilities, media sharing tools), etc.). The design works from the top down, including goals desired, targets desired, metrics needed, and data needed. This can be customized in implementation based on data collected, metrics computed, targets evaluated, and goals impacted.

As a non-limiting example, an administrator may desire to achieve a specified abandon rate (AR). To drive toward the specified AR, the administrator creates a goal, setting a desired AR range for each service class where attributes are used to determine the service classes. Specific work/resource policies can be included, if needed. The work assignment engine checks all possible routing options against a scoring function to drive the operating AR to the desired range. The work assignment engine makes proper trade-offs among different service classes based on a user-specified priority.

Thereafter, the administrator sets targets. For instance, the following targets may be specified:
  % Abandon Targets
    Sales/First Time: 0-2%
    Sales/Existing: 0-5%
    Support/Trouble: 5-10%
    Others: 0-20%

Third, the administrator defines what metrics and data are needed. The AR count can be flexibly fine-tuned/customized to meet the specific needs of the contact center. Priorities are determined for each target group. The highest priority group or groups are selected and the task or tasks that are most likely to abandon are chosen.

By serving a task in an "under target" group, the administrator can improve (move) the % abandon into target range. By not serving an "over target" group, the administrator can push the % abandon back into target range. Within the reporting structure, the AR is successfully driven towards the target.

In another non-limiting example, the administrator may desire to set goals for AR and service level (SL). Accordingly, the administrator sets a desired range of SL and AR for each attribute group. Attributes are used to determine matches. The mechanism checks all possible routing options against a scoring function to drive the operating SL and AR simultaneously to the desired range and makes proper trade-offs among different groups based on the administrator-specified priority. For instance, the following goals may be defined:

| Goals | |
|---|---|
| Sales/First Time | 0-2% AB |
| (serve fast as possible) | 95-100% in 20 sec. SL |
| Sales/Existing | 0-5% AB |
| (willing to let them wait since don't have any special offers) | 80-100% in 30 sec. SL |
| Disconnect + Internet | 1-2% AB |
| (want to offer a promotion to keep customer) | 95-100% in 20 sec. SL |
| Trouble | 5-10% AB |
| (don't over-serve) | 60-90% in 60 sec. SL |
| Others | 10-20% AB |
| (historically not important to business) | 70-95% in 120 sec. SL |

Insights gained from such goals include the ability to determine the distributions among calls for different products, the ability to drill down through activities like wait time, the ability to determine resolution across resources to identify training opportunities, and the ability to find relationships between AB/SL and a customer satisfaction score. Multiple goals can successfully be driven towards a regional target.

It is another aspect of the present disclosure to provide a workflow that supports temporal goals and defines a flexible framework for process metrics. Specifically, there are many aspects to operations in a contact center and it would be advantageous to have a single system and a single workflow process as a source of events that sends commands to controllers for execution. The proposed system gathers events from controllers and uses the workflow to orchestrate commands. The commands use scripts associated with the workflow for detailed operations.

Workflow nodes have some basic properties that define process-based metrics, including how many have been processed since the start, how many are active now, and what is the last relationship that completed this task. An example of a workflow task node might be contact voice IVR. An example of a decision node might be account status. Find best agent might have properties including count-processed, sum duration, count in-process, and last relationship. Each of the workflow elements can be used to recreate a customer experience and to create new and fine-tuned metrics.

In a non-limiting example, a workflow may be used to count the number of abandons. The count may include abandons at each stage, including contact IVR, account status, find best agent, agent welcome, etc. If an administrator only wants a metric that counts find best agent and agent welcome abandons, the administrator can fine-tune the reporting since all of the elements are in one system. The source events for abandon counting is defined by looking at the workflow and defining which tasks are considered for abandon.

The proposed workflow provides flexibility, which is completely defined by the contact center administrator rather than a predefined state model in one or more databases. The workflow provides structure and the source of events rather than a rigid system that writes code to get an event or to query to see if the event exists.

It is yet another aspect of the present disclosure to provide a mechanism for integrating unstructured data into a graph-based contact center where the relationships are defined during the recording of actual associations between nodes in the graph database. In the graph-based contact center, there is no requirement for a prebuilt or a priori defined schema. In the graph database, nodes get created automatically based on unstructured data that comes into the contact center. The model includes basic nodes and relationships that expand as new categories and values come into the contact center and are added to the model. Attributes for agents and customers can be organized and nodes and relationships can be created based on agent notes/feedback, information from agent texts, keywords, tagging, and topics. Each of these can be translated into relationships and nodes, which provides immediate access and efficiency for work assignment, IVR, and reporting for all data.

The nodes connected by the relationships provide much richer connectivity that can be derived by pattern recognition because there is no existing pattern to match. The graph itself connects the data together, unlike a schema or a common structured/unstructured store. All of the data is stored in the graph database, and all of the data can be queried in very complex ways to derive causal behavior and influence domain. Discovery of concepts and mechanisms that are hidden become possible based on "anti-patterns" that cause deviation from what is expected.

The proposed solution solves problems of the prior art by defining a system of metrics in a graph-based contact center related by a graph to goals and thresholds. The relationships are implicit in the model, so the communication system doesn't have to analyze the data to find the relationships.

Other relationships that are previously unknown and/or undiscovered can be discovered and queried by following the data source relationships. The graph can be used to find the unexpected or hidden relationships that are two or more (even 10) relationships away from what is known, similar to when the friends of friends of friends buy a product based on Facebook posts.

The relationship is discoverable by simply walking the nodes and relationships of the graph. From purchase information, the communication system can infer an expected behavior and then measure that expected behavior when the system changes. By knowing what has changed (assuming temporal change), the communication system can derive the relationship of the metrics that were used to make the changes and any relationships to the metrics previously measured. These two metrics can then be related in the graph by properties and or symbolic formulas (also properties).

In a non-limiting learning scenario, the following steps occur:

(1) A call comes in from customer Mary with associated attributes. Mary calls in to obtain order status.

(2) A Work Assignment Engine assigns the call to agent Ted. Ted resolves the issue by providing status.

(3) All attributes from the caller, the agent, the conference, and the positive outcome are fed into a learner.

(4) The learner updates rules based on the results of the interaction.

The learning process is what people call online machine learning, where the learner is operable to learn from one instance at a time. Based on experiential learning, the leaner can predict the probability of a positive outcome. In the example, the goal is for agent Ted to resolve the issue. When a work item comes in, the work assignment engine can consider all possible matches and pick a match that has the highest probability for the conference to reach a resolution node (e.g., a particular type of node in the graph database) based on previous resolutions and on all parameters and attributes of the interactions.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be a graph database as described herein. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
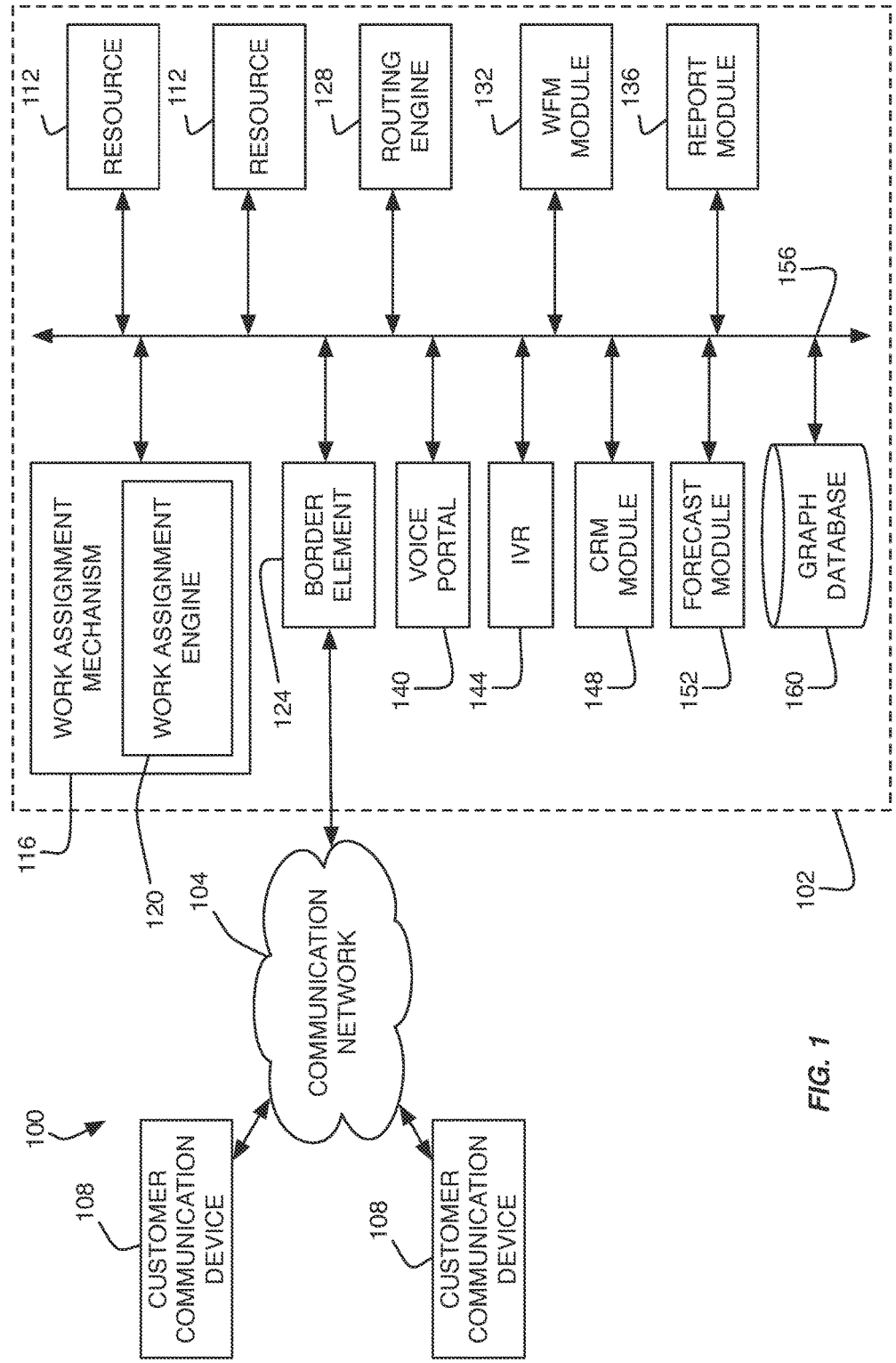
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting components of a contact center 102 to one or more customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 128 to connect the communication device 108 which initiated the communication with the assigned resource 112.

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128. The resources 112 can either be completely automated resources (e.g., processors, servers, or the like), human resources utilizing communication devices (e.g., human agents utilizing a computer, telephone, laptop, etc.), or any other resource known to be used in contact centers. In other embodiments, the work assignment mechanism 116 may assign a work item to an IVR 144, a voice portal 140, or some other component of the contact center 102 prior to or simultaneous with assigning the work item to a human resource 112 (e.g., contact center agent). As will be discussed in further detail herein, the components of the contact center 102 may be configured to work collectively to resolve a work item and a workflow may be implemented by the work assignment mechanism 116 to ensure that such resolution is obtained with customer satisfaction.

In some embodiments the components of the contact center 102 may be owned and operated by a common entity.

In some embodiments, every component of the contact center 102 may be administered by a single entity; however, in other embodiments, different components of the contact center 102 may be administered by different entities. For instance, some resources 102 may be managed by the entity that manages the work assignment mechanism 116 (e.g., internal resources 112), and other resources 112 may be managed by entities other than the entity that manages the work assignment mechanism 116 (e.g., external resources). The utilization of external resources 112 may be desirable during periods of work surplus—when there is too much work volume for the internal resources 112 to properly process the work items.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

More specifically, the work assignment engine 120 can determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

Additional components of the contact center 102 are shown to include a border element 124, a Work Force Management (WFM) module 132, a reporting module 136, a voice portal 140, an IVR 144, a Customer Relationship Management (CRM) module 148, a work forecasting module 152, and a graph database 160. Each of the depicted components may be connected to one another within the contact center 102 by an internal network 156. In some embodiments, the internal network 156 may correspond to a protected LAN or WAN whose security is maintained by an administrator of the contact center 102. Although each of the components of the contact center 102 are shown as being co-located with one another, it should be appreciated that such a configuration of components is not required. To the contrary, some of the contact center 102 components may be distributed and connected to one another over the communication network 104, but the communications between such components may be secured with tunneling protocols or a Virtual Private Network (VPN).

The border element 124, in some embodiments, is designed to maintain a secure separation between the unprotected and untrusted communication network 104 and the internal network 156. Examples of the border element 124 includes, without limitation, a Session Border Controller (SBC), a firewall, a gateway, a router, or the like. The border element 124 may comprise logic that enables communications between the networks 104, 156 even though the networks 104, 156 may utilize different communication protocols. Moreover, the border element 124 may comprise security features that block untrusted or unwanted communication attempts from the communication network 104, thereby preventing the internal network 156 from security breaches.

The WFM module 132 may be configured to manage the work force of the contact center 102 (namely the human resources 112). The WFM module 132 may comprise functionality that monitors current work item volume, current resource availability/utilization, past work item volume, past resource availability/utilization, estimate wait times, service levels, and other objectives to determine if the contact center 102 is operating in accordance with one or more predefined objectives. The WFM module 132 may also be configured to adjust or suggested adjustments to staffing levels based on the monitoring performed thereby. The WFM module 132 may also be configured to monitor Service Level Agreements (SLAs) between the contact center 102 and providers of external resources 112 to ensure that the SLA is being complied with. The WFM module 132 may further be configured to monitor schedule adherence, social media activity, and the like and the WFM module 132 may enable shift bidding, schedule adjustments, work-at-home agent re-scheduling, and the like. Basically, any aspect of resource management may be executed by the WFM module 132 or made available to a contact center administrator or manager for execution.

The reporting module 136 may be utilized to generate one or more reports that indicate performance of the contact center 102. In some embodiments, the reporting module 136 may be configured to pull data from the graph database 160 and prepare such data in a human-readable format. Advantageously, the reporting module 136 may be configured to run one or more reports for predefined data automatically at predefined intervals. The reporting module 136 may also be enabled to run ad-hoc reports based on inputs received from a contact center administrator or manager. Further still, the reporting module 136 may be configured to run reports in response to a predetermined event or series of events occurring in the contact center 102. As will be described in detail below, thanks to the utilization of a graph database 160 in the contact center 102, the amount of information available to the reporting module 136 is significantly richer than in prior contact center architectures. The graph database 160 can be configured to store information about any or all components of the contact center 102 and, therefore, many any or all information available to the reporting module 136. Further still, because the information maintained in the graph database 160 is not limited or structured in a predefined way, the reporting module 136 can be configured to run reports showing relationships between different contact center 102 components. As a non-limiting example, the reporting module 136 may be configured to run a report simultaneously showing WFM statistics (e.g., resource utilization, compliance with SLA agreements, compliance with objectives, etc.) with agent performance statistics (e.g., Key Performance Indicators (KPIs)) with work assignment engine performance statistics (e.g., decisions per time period, successful routing decisions, estimated wait time, etc.).

The voice portal 140 and/or IVR 144 may be configured to provide media services and/or automated customer service processing to work items in the contact center. In some embodiments, the voice portal 140 may provide the media portion needed to complete IVR functions whereas the IVR 144 provides the logic for interacting with a customer. Said another way, the IVR 144 and voice portal 140 may work together to provide IVR services to customers. The IVR 144 may control or operate the voice portal 140 in accordance with logic contained in the IVR 144.

The CRM module 148 may be configured to manage historical customer information, current customer information, information related to interactions between a customer and a contact center 102, customer preferences, customer purchase history, customer return history, customer aliases (e.g., in social media networks), and the like. Such information may be stored and maintained in the graph database 160. The CRM module 148 may be utilized to help the contact center 102 provide a more robust and personalized customer service experience. In some embodiments, the CRM module 148 may provide also retrieve desired CRM information from the graph database 160 to enable a resource 112 to more efficiently process a work item for a returning or known customer. For instance, when a work item is received in a contact center 102 and the work item is associated with a customer having historical information stored as CRM information in the graph database 160, the CRM module 148 may retrieve some or all of the CRM information and provide the retrieved information to a resource 112, thereby enabling the resource 112 to provide a more personalized service to the customer.

The forecast module 152 may operate in conjunction with the WFM module 132. In particular, the WFM module 132 may attempt to schedule resources 112 for future shifts in the contact center 102 and the forecast module 152 may be used to help forecast work item volume in the contact enter for the desired shift period. Additionally, the forecast module 152 may be used to automatically identify future resources availability issues (in the short-term or long-term) and notify the WFM 132, thereby enabling the WFM 132 to schedule more or less resources 112 as necessary. In some embodiments, the forecast module 152 is capable of analyzing prior contact center performance and contact volume in addition to monitoring current volume to determine if the contact center will need more or less resources 112 at a given time.

The graph database 160 may correspond to one or many database systems that maintain information related to the contact center 102 in a graph-based format. Contrasted against traditional hierarchical databases, the graph database 160 is a database that uses graph structures with nodes, edges, and properties to represent and store data. A graph database 160 may correspond to any storage system that provides index-free adjacency, meaning that every element in the graph database 160 contains a direct pointer to its adjacent elements and no index lookups are necessary. General graph databases that can store any graph are distinct from specialized graph databases such as triplestores and network databases. It should be appreciated that any type of graph database current known or yet to be developed can be utilized as the graph database 160.

Compared with relational databases, the graph database 160 is faster for associative data sets, and maps more directly to the structure of object-oriented applications. The graph database 160 can scale more naturally to large data sets as it does not typically require expensive join operations. As the graph database 160 depends less on a rigid schema, it is more suitable to manage ad hoc and changing data with evolving schemas. As will be discussed herein, the graph database 160 is powerful in that it can be used to complete graph-like queries, for example computing the shortest path between two nodes in the graph, which can be highly useful to the WFM module 132, the reporting module 136, the forecast module 152, and the like. Other graph-like queries can be performed over a graph database in a natural way (for example graph's diameter computations or community detection).

Figure 2:
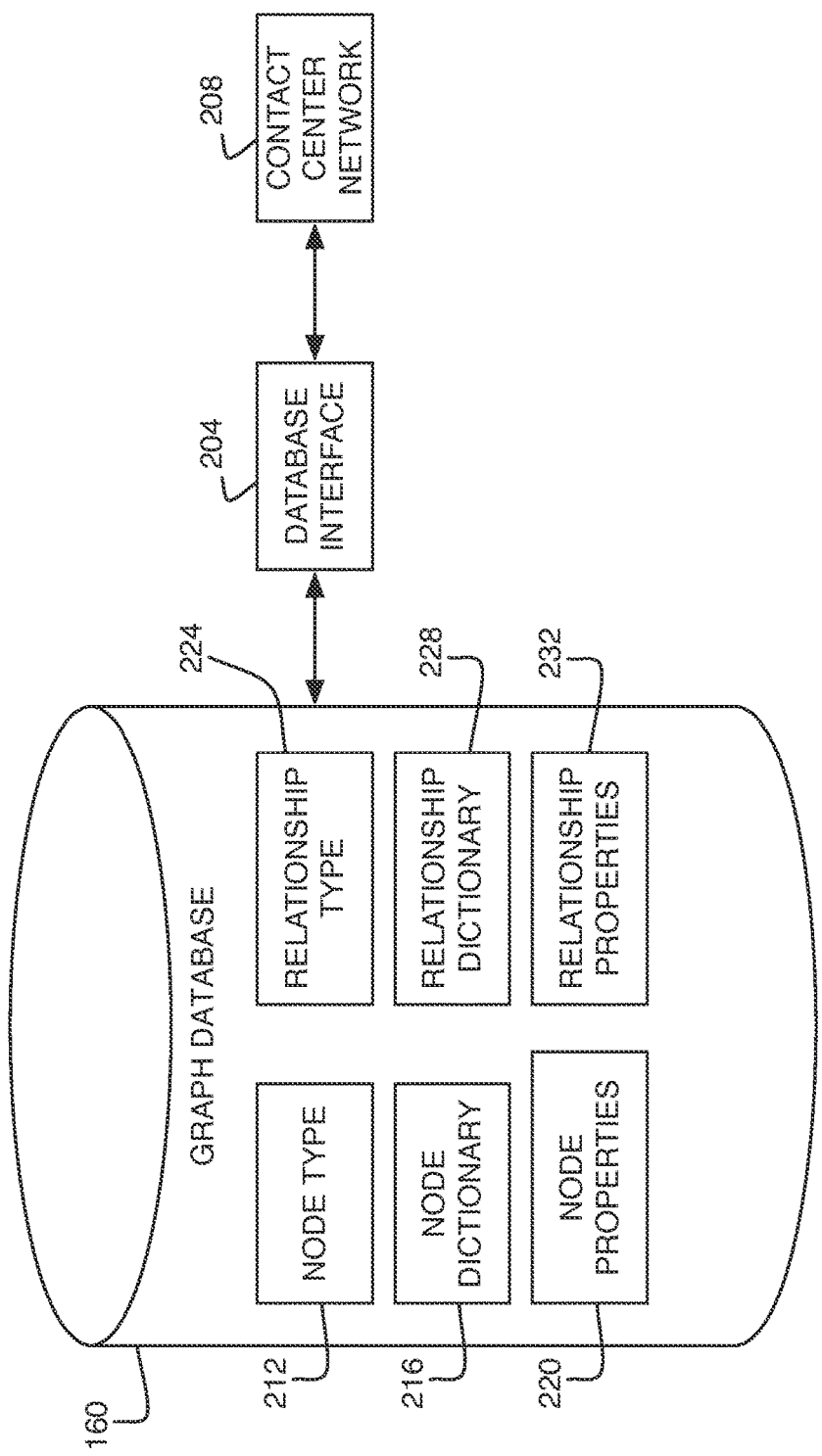
FIG. 2 is a block diagram depicting a graph database in accordance with embodiments of the present disclosure.

With reference now to FIG. 2, additional details of a graph database 160 used in a contact center 102 will be described in accordance with at least some embodiments of the present disclosure. The graph database 160 may connect to the contact center network 208 (e.g., the internal network 156) via a database interface 204. The database interface 204 may provide the mechanism for various contact center 102 components to write information to the graph database 160 as well as retrieve information from the graph database 160. In some embodiments, database interface 204 may define the commands to retrieve information from the graph database 160 as well as write information to the graph database 160.

In some embodiments, the graph database 160 may comprise a plurality of data elements (e.g., data instances) in the form of nodes and relationships for the events, activities, entities, personnel, and components of the contact center 102. Specifically, the graph database 160 may comprise a node type definition 212, a node dictionary 216, and node properties 220. Likewise, the graph database 160 may comprise a relationship type definition 224, a relationship dictionary 228, and relationship properties 232. The node type definition 212 may comprise information that defines nodes within the graph database 160 whereas the relationship type definition 224 may comprise information that defines the relationships between nodes within the graph database 160. Examples of data elements that can be represented in the graph database 160 as a node (e.g., may be a defined node type 212) include, without limitation, resources (e.g., human, machine, computational, equipment, etc.), groups of resources, work items, customer contacts (which are associated with work items), conferences, resolution, workflow actions, reporting actions, WFM actions, work item forecasting events, routing events, resource and/or work item attributes (e.g., in the form of an attribute tree), etc. The node dictionary 216 may comprise a description and/or definition of each node in the graph database 160. For instance, if the contact center 102 comprises nodes for resources, work items, customer contacts, conferences, and contact resolution, then the node dictionary 216 may identify those nodes and further provide information for defining those nodes within the graph database 160.

The node properties 220 may further define the properties that can belong to a node in the graph database 160. As a non-limiting example, the properties of a resource node may include resource name, resource Identifier (if different from name), date of node creation, date of node modification, etc.

Similar to the nodes, the relationships may be another data element in the graph database 160 and may have a defined relationship type that defines the nature of the relationship between two nodes, and a relationship dictionary 228 may maintain a list of all relationships as well as information defining those relationships (as compared to other relationships) within the graph database 160. The type of relationship may depend upon the nodes being connected by that relationship. For instance, a relationship between a resource node and a conference node may identify the time the relationship was created, a duration of how long the relationship lasted, and a value describing the relationship between the resource and conference node (e.g., work assignment decision, routing, etc.). The relationship properties 2323 may define the properties available to each of the relationships in the graph database 160 much like the node properties 220 define the properties available to nodes in the graph database 160. It should be appreciated that the relationship properties 232 and/or node properties 220 may dynamically change as the contact center 102 continues operation and new relationships between nodes are needed and/or created. Similarly, node types 212 may be dynamically modified (e.g., created, changed, deleted, merged, etc.) as an automated system identifies the need to modify such nodes within the contact center 102 (e.g., based on utilization, overutilization, or underutilization of nodes/relationships in the contact center 102).

Figure 3:
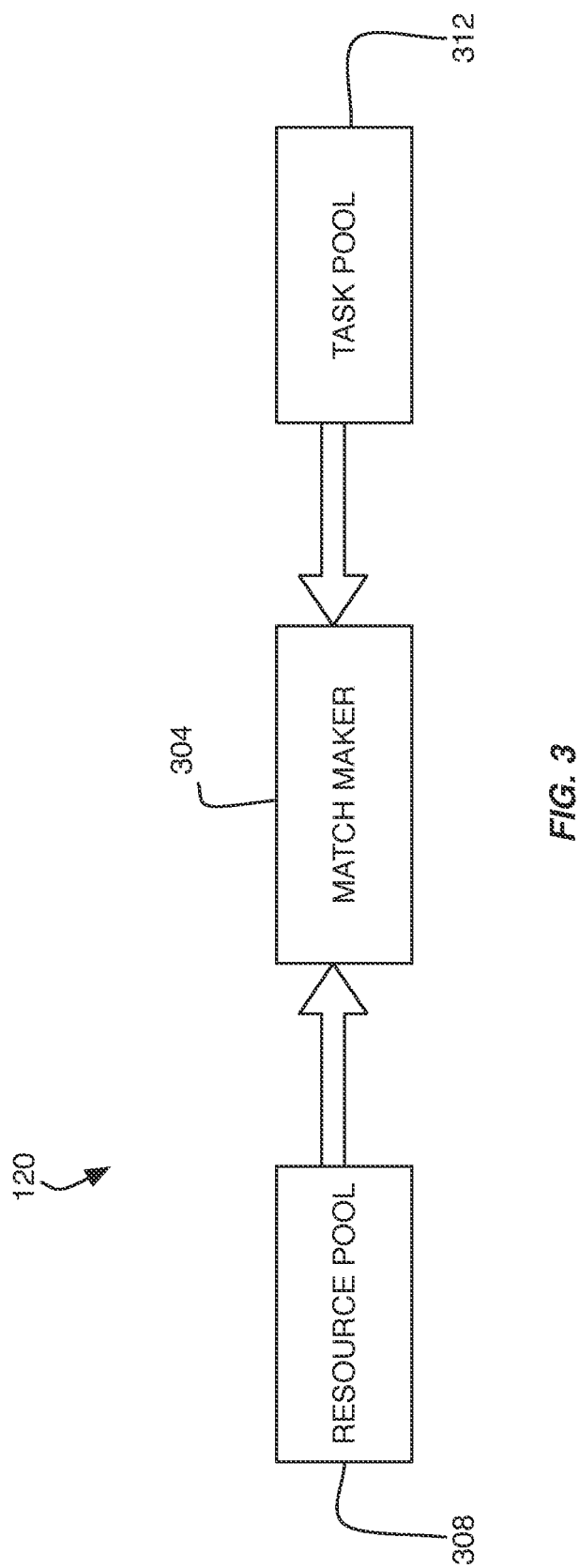
FIG. 3 is a block diagram depicting components of a work assignment engine in accordance with embodiments of the present disclosure.

With reference now to FIG. 3, additional details of a work assignment engine 120 will be described in accordance with at least some embodiments of the present disclosure. The work assignment engine 120 may comprise match maker logic 304 that matches work items from a task pool 312 with resources from a resource pool 308. In some embodiments, the work assignment engine 120 may consider information from the graph database 160 when making intelligent work assignment decisions. The work assignment engine 120 may also update nodes and/or relationships in the graph database 160 when work assignment decisions are made to reflect that a particular work item (or collection of work items) has been assigned to a particular resource (or collection of resources). In some embodiments, the work assignment decision may be referenced in the graph database 160 as a direct or indirect relationship between a resource node and a work item node. As a non-limiting example, the work item node may initially be connected to a conference node when the work item is created in the contact center. Once the resource is assigned to the work item, the resource node corresponding to the assigned resource may be connected to the same conference node to which the work item is connected, thereby indicating an assignment of the resource to the work item. The relationship between the resource and the conference node may indicate when the relationship was created (e.g., when the work assignment decision was made) as well as how long the relationship lasted (e.g., how long the resource took to process the work item). This information may then be preserved in the graph database 160 such that it is made available to the WFM module 132 and/or reporting module 136.

Figure 4:
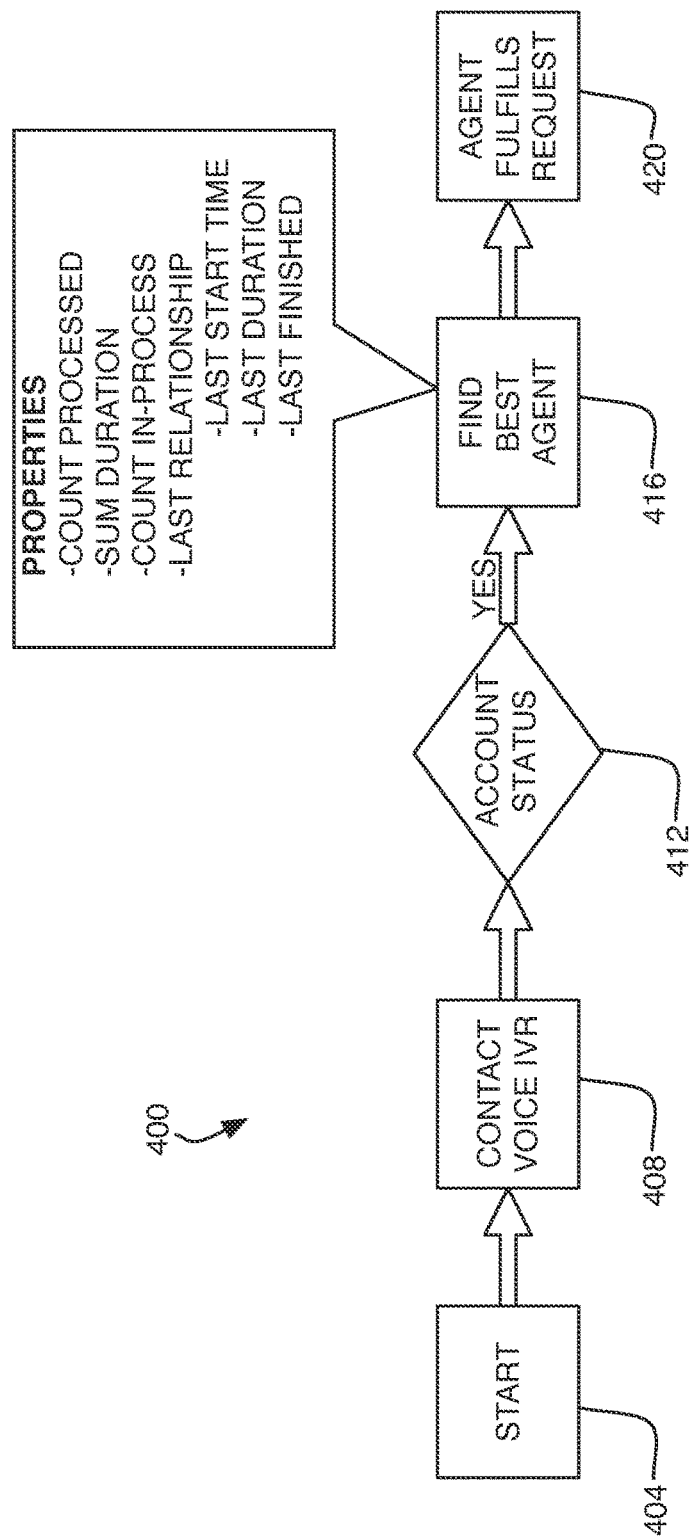
FIG. 4 is a block diagram depicting a first workflow in accordance with embodiments of the present disclosure.

With reference now to FIGS. 4-6B, examples of workflows and other data structures in the graph database 160 will be described in accordance with at least some embodiments of the present disclosure. Referring initially to FIG. 4, an illustrative workflow 400 is depicted as including a plurality of nodes 404, 408, 412, 416, 420, each being connected to one another via a relationship, either directly or indirectly. The workflow 400 is specifically shown to include a start node 404, a workflow task node 408, a decision node 412, a decision execution node 416, and a result node 420. The start node 404 indicates a start of the workflow 400. The properties of the start node may include when the workflow 400 was initiated/created as well as when other nodes in the graph database 160 became connected to the workflow 400.

The task node 408 may indicate a first task for the workflow 400. In the depicted example, the first task corresponds to an IVR task where a customer/contact is connected with the IVR 144 and/or voice portal 140. Following completion of the IVR task, the workflow 400 continues with a decision node 412 where it is determined whether the customer is seeking account information (e.g., bank account information). It is noted that the creation of the decision node may not occur until the IVR task is completed—that is the determination that the customer is seeking account information may be dependent upon the customer's interactions with the IVR. Accordingly, it should be appreciated that the creation of nodes in the workflow 400 may be dynamic and based upon customer and/or resource inputs that occur for the duration of the work item's existence in the contact center (e.g., until the work item is completely resolved).

Once it is determined that account status is desired, the workflow 400 continues at the decision execution node 416. In the depicted example, the decision execution node 416 may correspond to a node where the work assignment engine 120 begins a work assignment process and attempts to assign a resource 112 to a work item corresponding to the received contact. Properties of the decision execution node 416 may include a number of times that the work assignment decision has been counted, a duration of how long the process has taken to complete, an indication of whether a count is currently in process, and other information identifying the last relationship(s) between the decision execution node 416 and other nodes (e.g., last start time, last duration, last finish time, etc.).

If the workflow 400 is completed and a work assignment decision is made, the workflow 400 may also comprise a result node 420. The result node 420 may become a fully-populated node (e.g., having a complete set of properties) if the workflow 400 is successfully completed. If, however, the workflow 400 is not completed, then the result node 420 may be left fully or partially un-populated.

Figure 5:
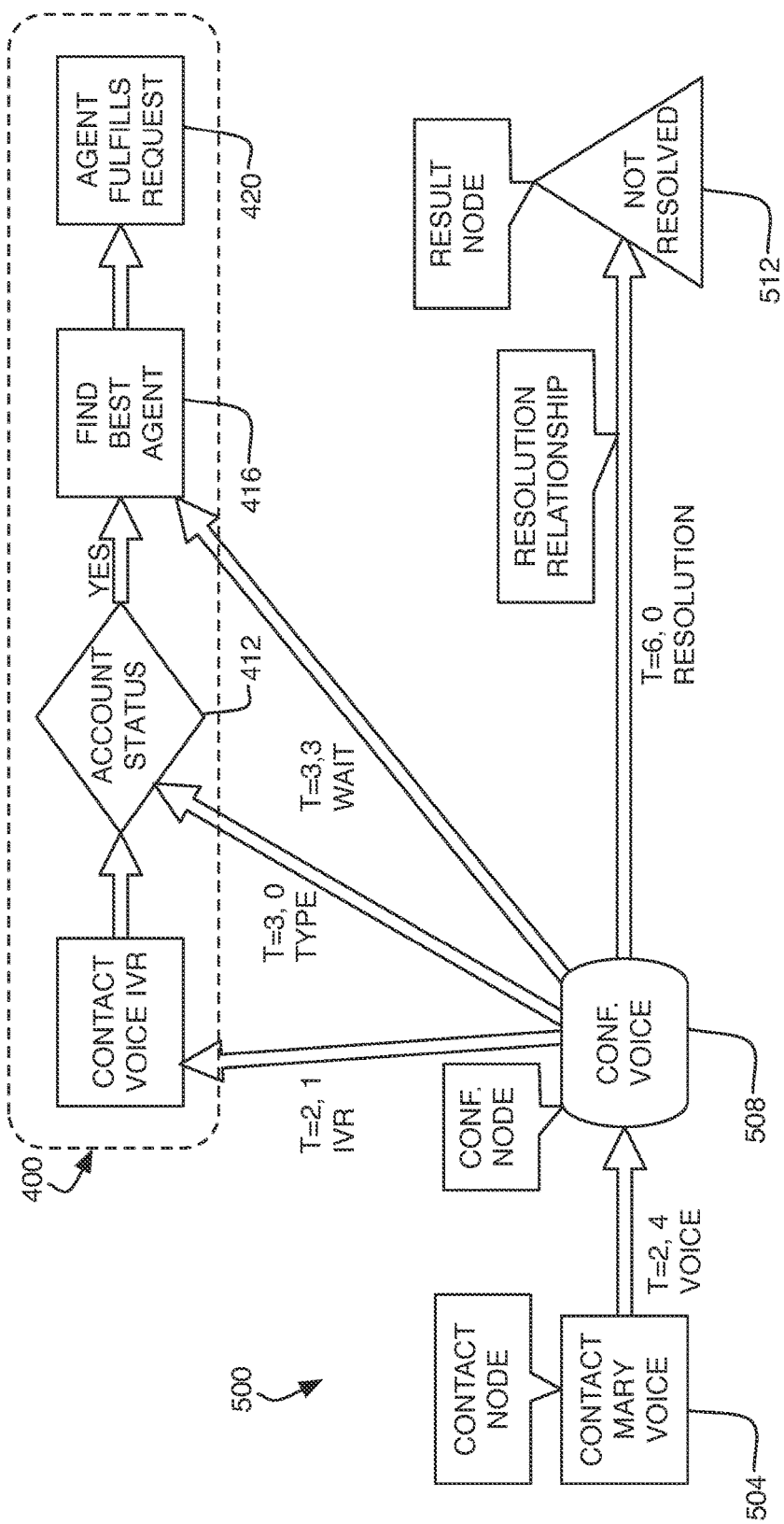
FIG. 5 is a block diagram depicting a workflow integrated into a graph database in accordance with embodiments of the present disclosure.

FIG. 5 depicts the workflow 400 in the context of a broader data structure stored in the graph database 160. Specifically, the workflow 400 is connected to a conference node 508 that is connected to a contact node 504. As can be appreciated, the contact node 504 may correspond to any node that describes a customer, a group of customers, or any other entity associated with a work item. The contact node may specifically correspond to a call node where the contact type is a call (as opposed to a non-real-time contact like a text, chat, email, fax, etc.) in which case the conference node 508 may correspond to a generic node. In another configuration, the contact node 504 may correspond to a generic node and the conference node 508 may identify the contact type (e.g., call, text, chat, email, fax, video, etc.). The contact node 504 may also identify the customer associated with the contact and may be created immediately upon receiving the contact in the contact center 102. The conference node 508 may correspond to the work required to be performed in connection with the contact (e.g., a work item) and the relationship between the contact node 504 and conference node 508 may identify when the relationship was created as well as the length of time the duration has existed. In some embodiments, the relationship may further identify the type of relationship between the contact node 504 and conference node 508. In the example of FIG. 5, the relationship is a voice-type relationship having a creation time at T=2 and a duration of four (4) units of time (e.g., seconds, minutes, hours, days, etc.). The units of time for the relationship may be provided in the relationship properties 232 of the graph database 160.

The conference node 508 is also connected to the various nodes in the workflow 400 and each connection to the workflow 400 may have a different relationship type and properties. For instance, when the workflow 400 was created, the conference node 508 may initially be connected to the workflow task node 408 via a relationship having IVR as the type, a creation time at T=2, and a duration of one (1) unit of time. Once the IVR function was completed, the workflow 400 continues and the conference node 508 is then connected to the decision node 412 at time T=3. Thereafter, the conference node 508 is connected to the decision execution node 416 at time T=3. As the work assignment engine 120 tries to find a best resource/agent for the work item, the duration of the relationship between the conference node 508 and decision execution node 416 continues to increase and the type of the relationship is set as "waiting" or "wait."

Figure 6A:
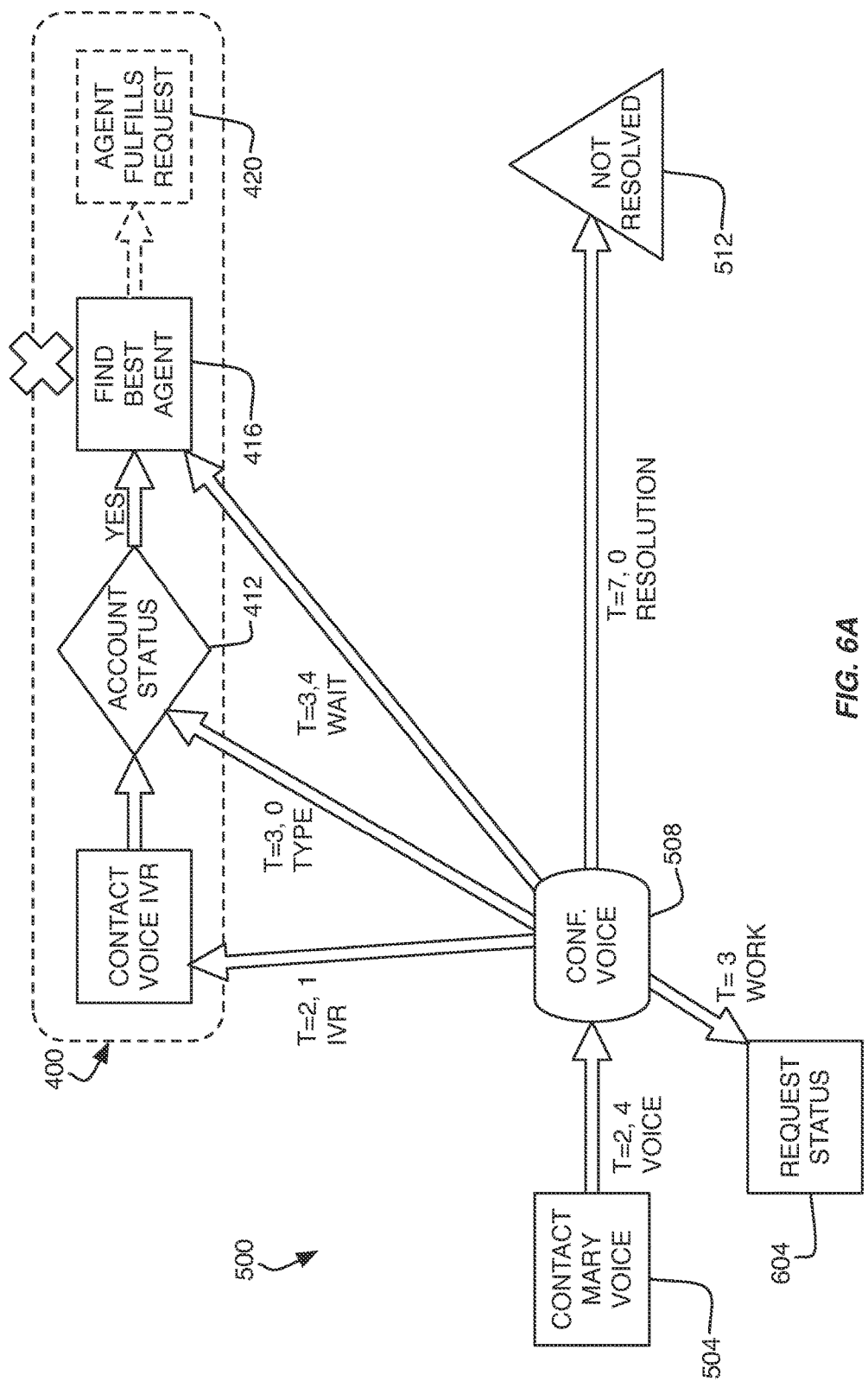
FIG. 6A is a block diagram depicting a graph database where a workflow is left uncompleted and the work item associated therewith is not resolved in accordance with embodiments of the present disclosure.
Figure 6B:
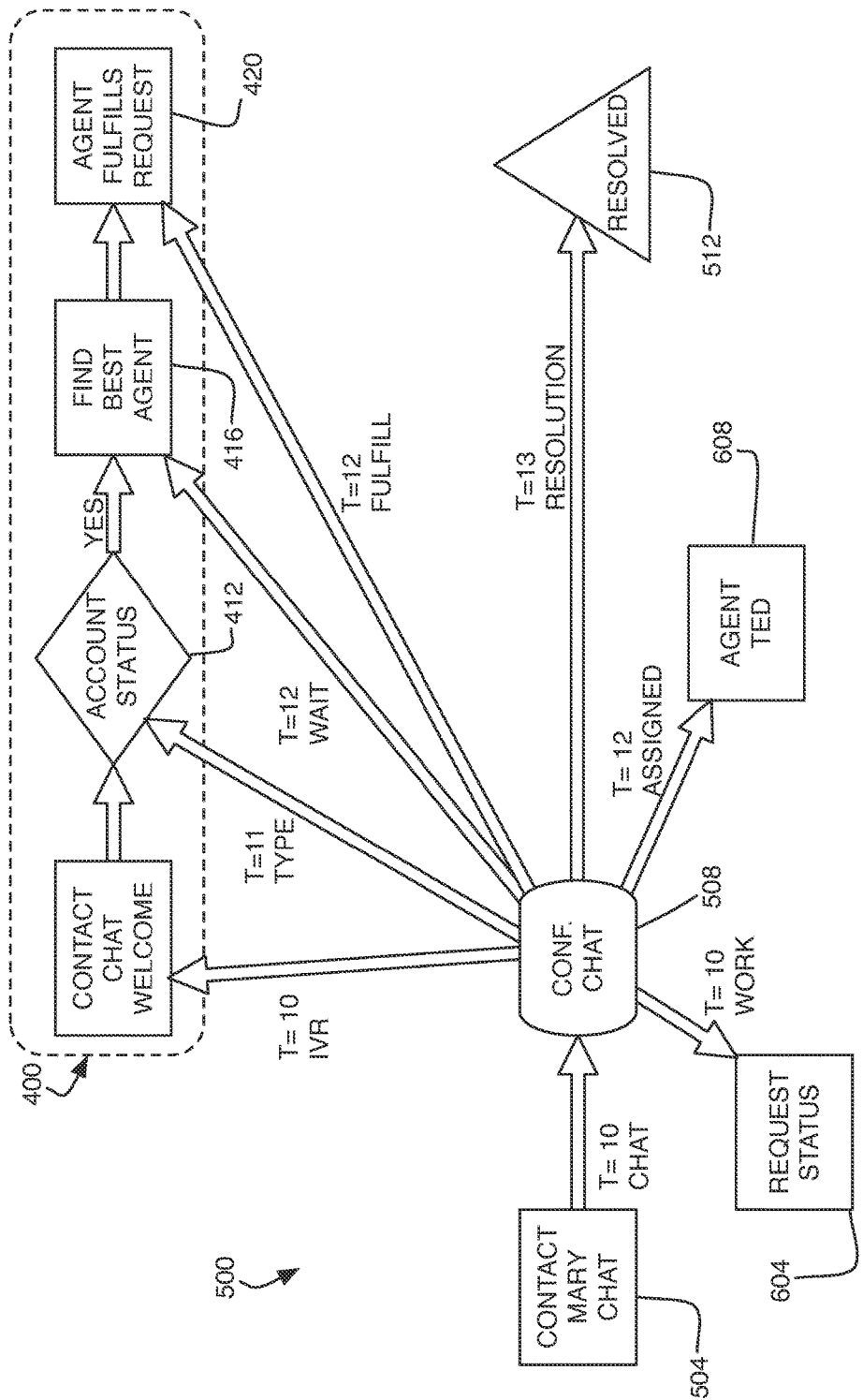
FIG. 6B is a block diagram depicting a graph database where a workflow is completed and the work item associated therewith is resolved in accordance with embodiments of the present disclosure.

Until the decision execution node 416 is completed and the work item is assigned to a resource 112. FIGS. 6A and 6B show the two possible outcomes (e.g., different configurations of data structures 500 that may result depending upon how the work assignment decision gets resolved and whether the decision is made in a timely manner (e.g., before the customer hangs up).

In the example of FIG. 6A, the decision execution node 416 fails and the workflow 400 is unable to be completed. When the workflow 400 is left uncompleted, the conference node 508 is connected to a result node 512 of a non-resolved type. The relationship between the conference node 508 and the result node 512 indicates that at time T=7 the workflow 400 failed and resolution, therefore, failed. In this particular example, the work assignment engine 120 may have been unable to find a suitable resource 112 in a timely manner or the work item may have been assigned to a resource 112, but the resource 112 was unable to complete processing the work item in a timely manner. In either scenario, the workflow 400 is left uncompleted and the relationship between the conference node 508 and result node 512 indicates that the work item was not resolved.

FIG. 6A also shows a reporting node 604 that is connected to the conference node 508. The reporting node 604 can be used to report some or all information about the workflow 400, the conference node 508, or any other node or relationship connected to the conference node 508. In some embodiments, the reporting node 604 may be temporarily established to retrieve a single instance of data from the data structure 500. In other embodiments, the reporting node 604 may persistently exist in the data structure 500 to continue reporting operations on nodes connected to the conference node 508.

FIG. 6B, as contrasted to FIG. 6A, depicts a situation where the workflow 400 is completed and the agent request is fulfilled. When the work assignment engine 120 is able to connect the work item to a resource, the result node 512 corresponds to a resolved type. Moreover, because the work item is assigned to a resource by the work assignment engine 120, the assigned resource (e.g., Agent Ted) and a resource node 608 representing the assigned resource is connected to the conference node 508. By connecting the resource node 608 to the conference node 508, the relationship between the work item and resource is easily ascertainable and can be reported by the reporting node 604. In the depicted embodiment, the resource is also able to completely resolve the processing needs of the work item, which allows the conference node 508 to be connected to the resolved result node 512. Also in the depicted embodiment, the times of relationship creation and their duration are maintained for each of the relationships. This information may become useful to the reporting node 604 when creating reports on the success, or lack thereof, of resolving the work item associated with the conference node 508.

Figure 7:
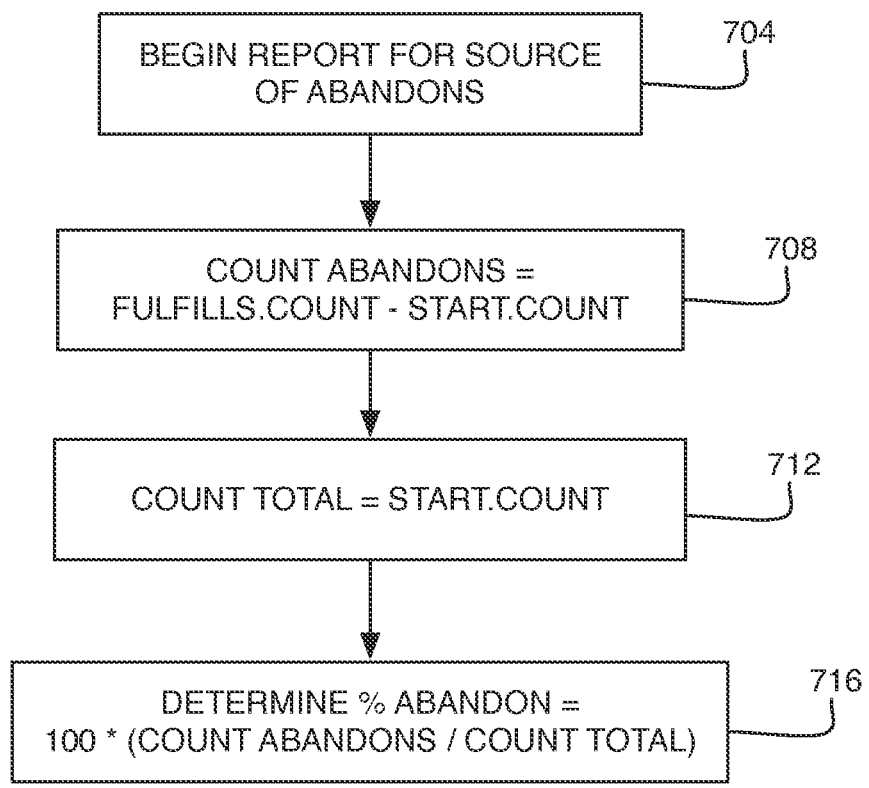
FIG. 7 is a flow chart depicting a method of reporting source of abandons in accordance with embodiments of the present disclosure.

With reference now to FIG. 7, a method of reporting a source of abandons will be described in accordance with at least some embodiments of the present disclosure. The method begins when it is determined that the source of abandons is desired to be known and a report is required (step 704). In response to beginning the reporting process, the method continues by counting the number of abandons in the graph database 160 (step 708). This count may correspond to a complete count of all abandons or to a count of abandons over a predetermined period of time. The abandons can be counted with the use of a reporting node 604 that searches for all nodes in the graph database 160 having a type of fulfillment as well as the number of start nodes 404. The number of starts can then be subtracted from the total number of fulfillment requests to obtain a count for the number of abandons.

The method continues by counting the total number of start requests (as previously counted in step 708) (step 712). It should be appreciated that the count of step 712 may be performed before, after, or simultaneous with step 708. The abandonment percentage can then be calculated by dividing the abandon count determined in step 708 by the total count determined in step 712 (step 716). This value can optionally be multiplied by one hundred (100) to obtain a percentage. Moreover, the source of abandons can be identified with the use of the reporting node 604 that can count the number of fulfillment requests that failed during the workflow task node 408, the decision node 412, the decision execution node 416, and the result node 420, respectively. The information obtained from the reporting node 604 can identify what proportions of all abandons occur during various stages of the workflow 400. If a higher percentage of abandons occur at a particular stage of workflow 400 (e.g., during IVR or during work assignment), then the source of abandons can be identified, or at least inferred. For instance, if a majority (e.g., greater than 40%) of abandons occur during the IVR node, then it may be inferred that there is a problem with the IVR script such as a loop, faulty voice-recognition, improper menu items, etc. As another example, if a majority of abandons occur during the decision execution node 416 (e.g., during work assignment), then it may be determined that wait time is getting too large for customer satisfaction and the WFM module 132 may be implemented to determined an optimal work force size.

Figure 8:
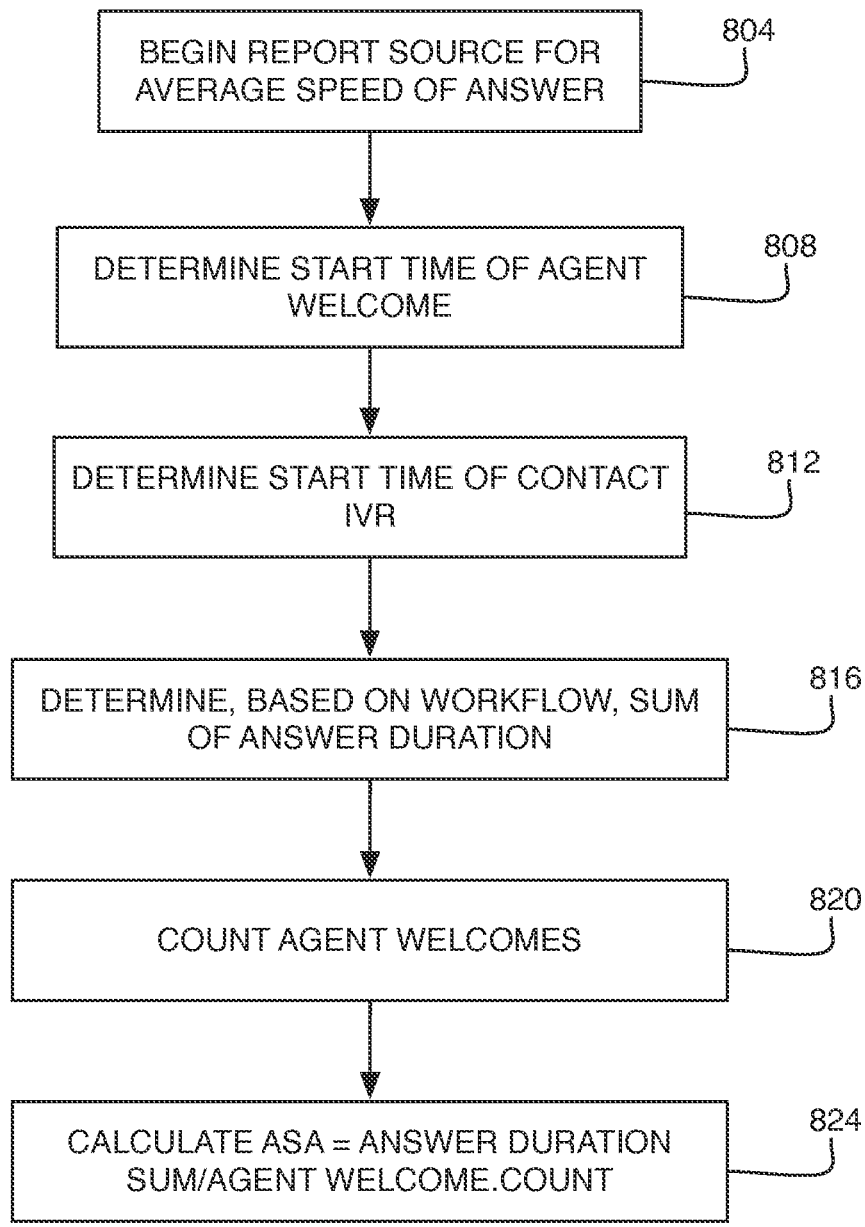
FIG. 8 is a flow chart depicting a method of reporting source of average speed of answer in accordance with embodiments of the present disclosure.

With reference now to FIG. 8, a method of reporting for average speed of answer (ASA) will be described in accordance with at least some embodiments of the present disclosure. The method begins when it is determined that a report on ASA is desired (step 804). This may occur systematically and on a periodic basis or it may be determined in response to a contact center administrator or manager placing a request for such a report.

The method continues by determining a start time for each agent welcome event in the graph database 160 (step 808). In some embodiments, the start times may be determined for only agent welcome events that occurred within a predetermined period of time. These events may correspond to nodes in the graph database 160.

For each workflow 408 having an agent welcome event identified in step 808 and having a start time determined therefor, the method continues by determining a start time, if any, of an IVR event for the workflow 400 (step 812). Thus, if a workflow comprises both an agent welcome event that was completed along with an IVR event, then the start times for both of those events is determined.

Thereafter, the method continues by determining, based on the workflow, the sum of answer duration (step 816). In some embodiments, the sum of answer duration corresponds to a summed value of each workflow's agent welcome time less the start time of the IVR event. Said another way, the sum of all answer durations is determined for the time period in question by analyzing workflows and determining the amount of time that elapsed between the start time of an IVR event and the start time of an agent welcome.

The method continues by counting the number of agent welcome events in the workflows being analyzed (step 820) and then calculating the ASA for the workflows (step 824).

In some embodiments, the ASA is calculated by dividing the sum of answer duration as determined in step 816 by the total number of agent welcomes counted in step 820. It should be appreciated that other metrics may be used to calculate or estimate ASA without departing from the scope of the present disclosure.

Figure 9:
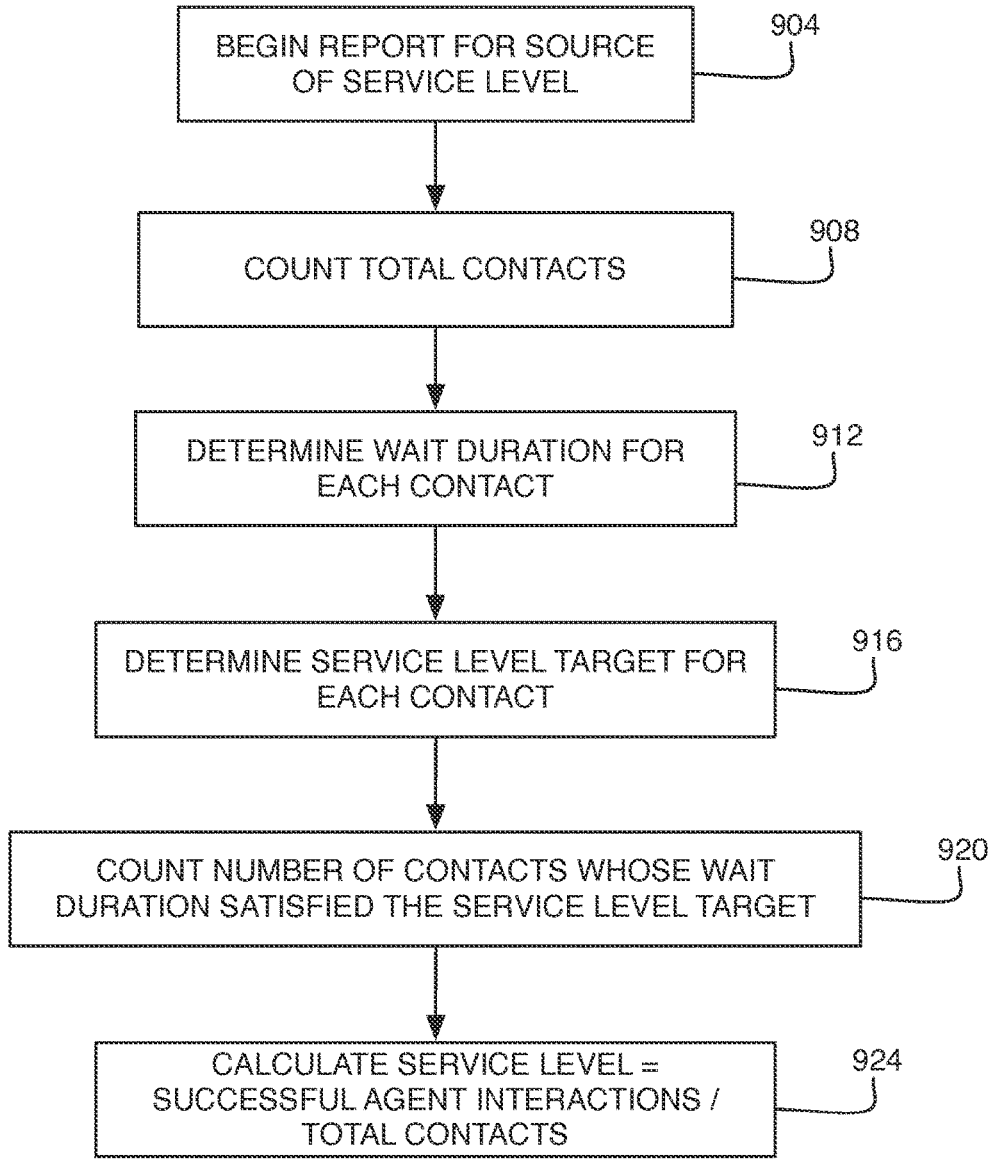
FIG. 9 is a flow chart depicting a method of reporting source of service level in accordance with embodiments of the present disclosure.

With reference now to FIG. 9, a method of reporting a source of service level (SL) will be described in accordance with at least some embodiments of the present disclosure. The method begins when it is determined that a report is desired for service level or a source thereof (step 904). Thereafter, the total number of contacts (e.g., contact nodes) are counted (step 908). In some embodiments, only the contact nodes having a creation time within a time period of interest are counted in step 908.

For each contact counted in step 908, the method continues by determining an actual wait time for the contacts (step 912). In some embodiments, the wait time for a contact may correspond to a difference between the creation time of a work item associated with the contact and the time when an agent/resource is connected to the work item. In some embodiments, the wait time for a contact may correspond to a difference between a time when a contact node is connected to a conference node and a time when an assigned resource is connected to the same conference node. In some embodiments, the wait time for a contact may correspond to a duration of a relationship between a contact node and a work assignment decision node 416.

The method continues by determining a service level target for each contact counted in step 908 (step 916). The service level target may be represented as an absolute time value and may be normalized to the time units used to calculate the duration in step 912. In some embodiments, the service level target may correspond to a particular target time or a range of target times (e.g., an acceptable range residing above a minimum value and below a maximum value).

The method again continues by counting the number of contacts whose wait duration satisfied the service level target (step 920). The contacts whose wait duration satisfied the service level target may be considered successful agent interactions, at least from a work assignment standpoint.

The service level is then calculated by dividing the successful agent interactions as identified in step 920 by the total number of contacts determined in step 908 (step 924). The service level can then be reported via the reporting module 136.

Figure 10:
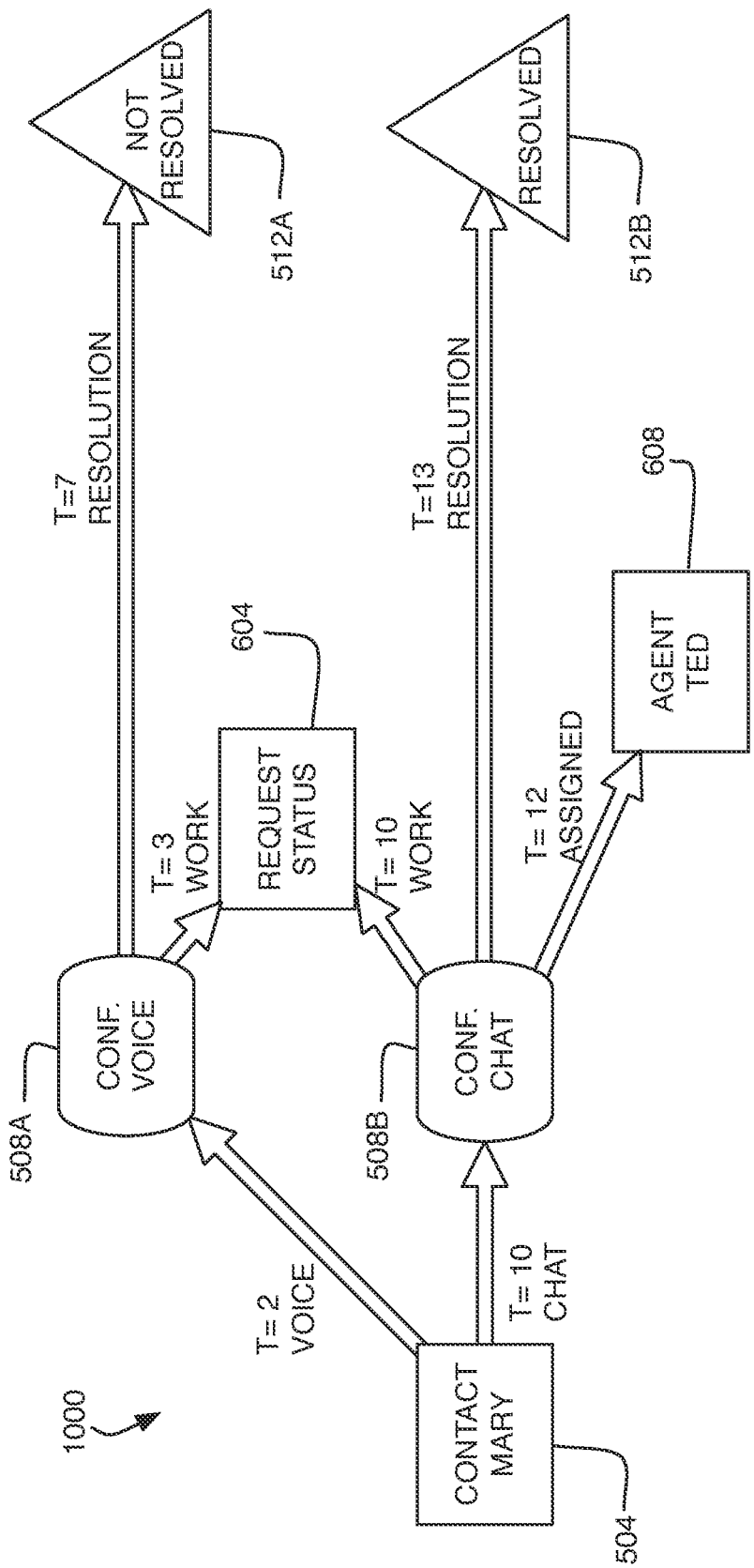
FIG. 10 is a block diagram depicting a multi-contact work item in a graph database in accordance with embodiments of the present disclosure.

With reference now to FIG. 10, another example of a data structure 1000 in a graph database 160 is shown whereby contact resolution is considered successful after two attempts. In other words, the first attempt at contact resolution was actually unsuccessful in the events depicted in the data structure 1000. However, thanks to the utilization of a graph database 160, the first failed attempt at resolution and second successful attempt at resolution can be logically connected to one another and a reporting module 136 can identify the overall customer interaction with the contact center 102 as successful.

Specifically, the data structure 1000 shows the contact node 504 as being connected to a first conference node 508A and a second conference node 508B. The first conference node 508A is shown as being of a different type than the second conference node 508B (e.g., voice conference versus chat conference). However, because both conferences and separate work items associated therewith were actually initiated by the same customer (e.g., Mary), the graph database 160 can maintain a logical association with the two interactions and both interactions can be simultaneously reported on via the reporting node 604.

As shown in the depicted example, the first conference node 508A is connected to a first resolution node 512A whereas the second conference node 508B is connected to a second resolution node 512B. The conference nodes 508A, 508B may both be connected to the same contact node 504 and the same reporting node 604. The report that can be generated by the reporting node 604 may indicate that the first conference node was connected to the contact node 504 at time T=2 and a voice call was attempted to be assigned to a resource. Failure to resolve the contact by time T=7 resulted in the first conference node 508A being connected to the first resolution node 512A; however, at time T=10, the same customer, Mary, escalated another contact (e.g., a chat). This chat was eventually assigned to a qualified resource at time T=12, which resulted in the second conference node 508B being connected to the second resolution node 512B.

Figure 11:
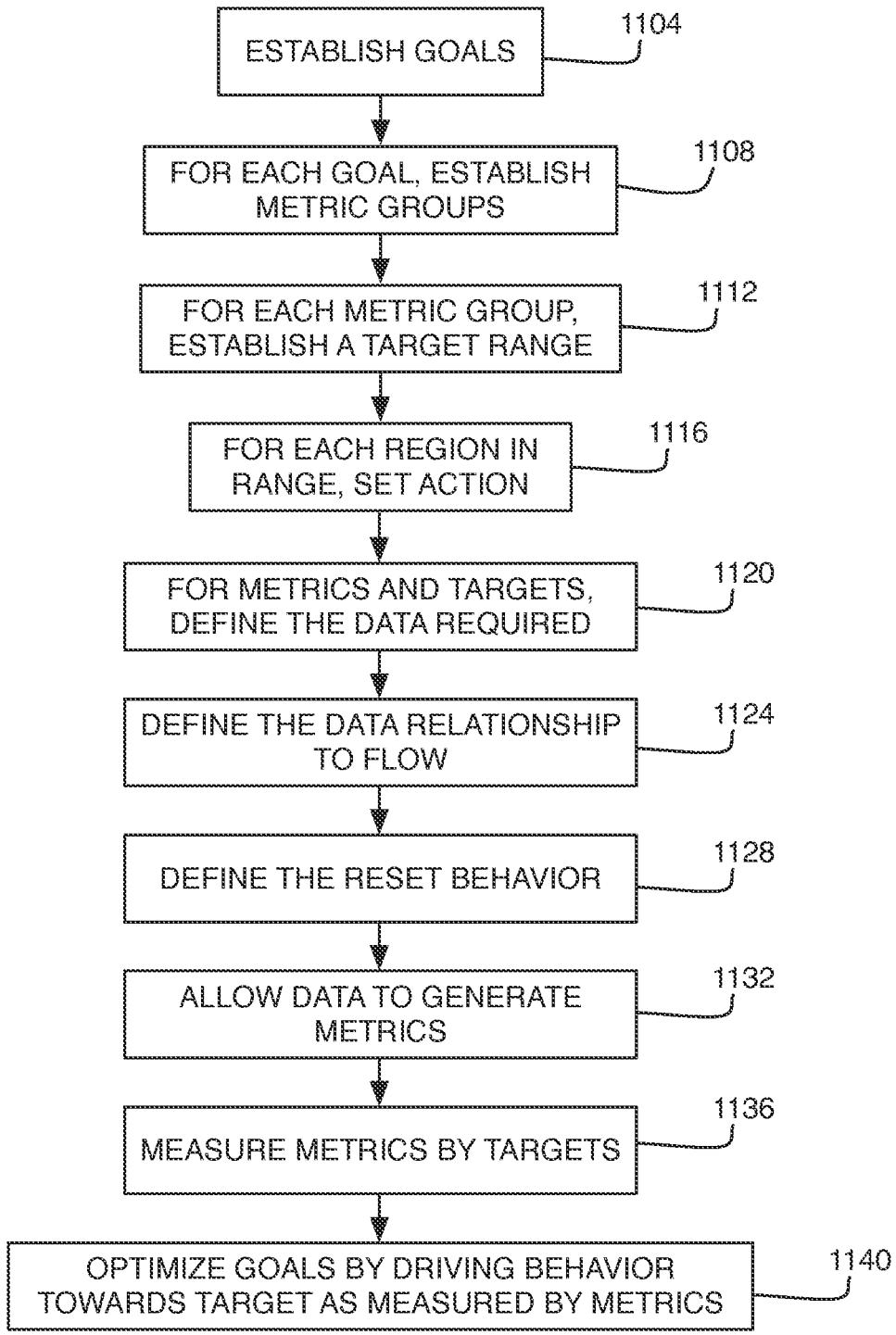
FIG. 11 is a flow diagram depicting a method of optimizing goals in accordance with embodiments of the present disclosure.

With reference now to FIG. 11, a method of optimizing goals by driving behavior towards a target as measured by metrics will be described in accordance with embodiments of the present disclosure. The method is initiated by establishing one or more goals (step 1104). Examples of goals that may be established in a contact center include, without limitation, cost-based objectives, service level objectives, ASA objectives, abandonment objectives, first call resolution objectives, combinations thereof, or any other objective related to one or more KPIs in a contact center.

For each goal or objective, metric groups are established (step 1108) and a target range is established for each metric group (step 1112). As an example, first call resolution objectives may comprise metrics groups related to contact attempts, metrics for defining a successful contact resolution, and metrics for identifying when a contact should be counted. The target range may then define the desired metric values for that particular goal or objective.

For the metrics and targets defined in steps 1108-1116, the data required from the graph database 160 to define the metrics and targets is identified (step 1120). Additionally, the data relationship to flow out of the graph database 160 is defined (step 1124) as is the reset behavior (step 1128). The reset behavior may correspond to the behavior of the contact center 102 when the system is reset after a period of operation (e.g., resetting the goal at the end of a cycle). For instance, if minimizing abandons is the goal, then the metrics that are known to increase abandons may be to increase estimated wait time or increase ASA. The converse movement of estimated wait time and ASA may drive the number of abandons downward. In this example, the reset behavior may correspond to a behavior or contact center 102 configuration that is known to set the contact center 102 back to a predefined estimated wait time or ASA after the end of a day, week, etc.

The metrics, goals, and reset behavior may be defined by an administrator or manager of the contact center 102 and does not necessarily have to be defined by the provider of the contact center 102 equipment. Accordingly, the contact center operator (e.g., administrator or manager) is allowed to let the contact center 102 run, thereby causing the generation of data, which drives the metrics accordingly (step 1132). The metrics flowing out of the graph database 160 are then measured against the defined targets (step 1136) and the goals can be optimized by driving the contact center behavior towards the target as measured by the metrics (step 1140). Advantageously, since the data used to drive the contact center 102 is being obtained from the graph database 160, the data can include traditional work assignment data as well as other contact center data (e.g., WFM data, CRM data, workflow data, etc.).

Figure 12:
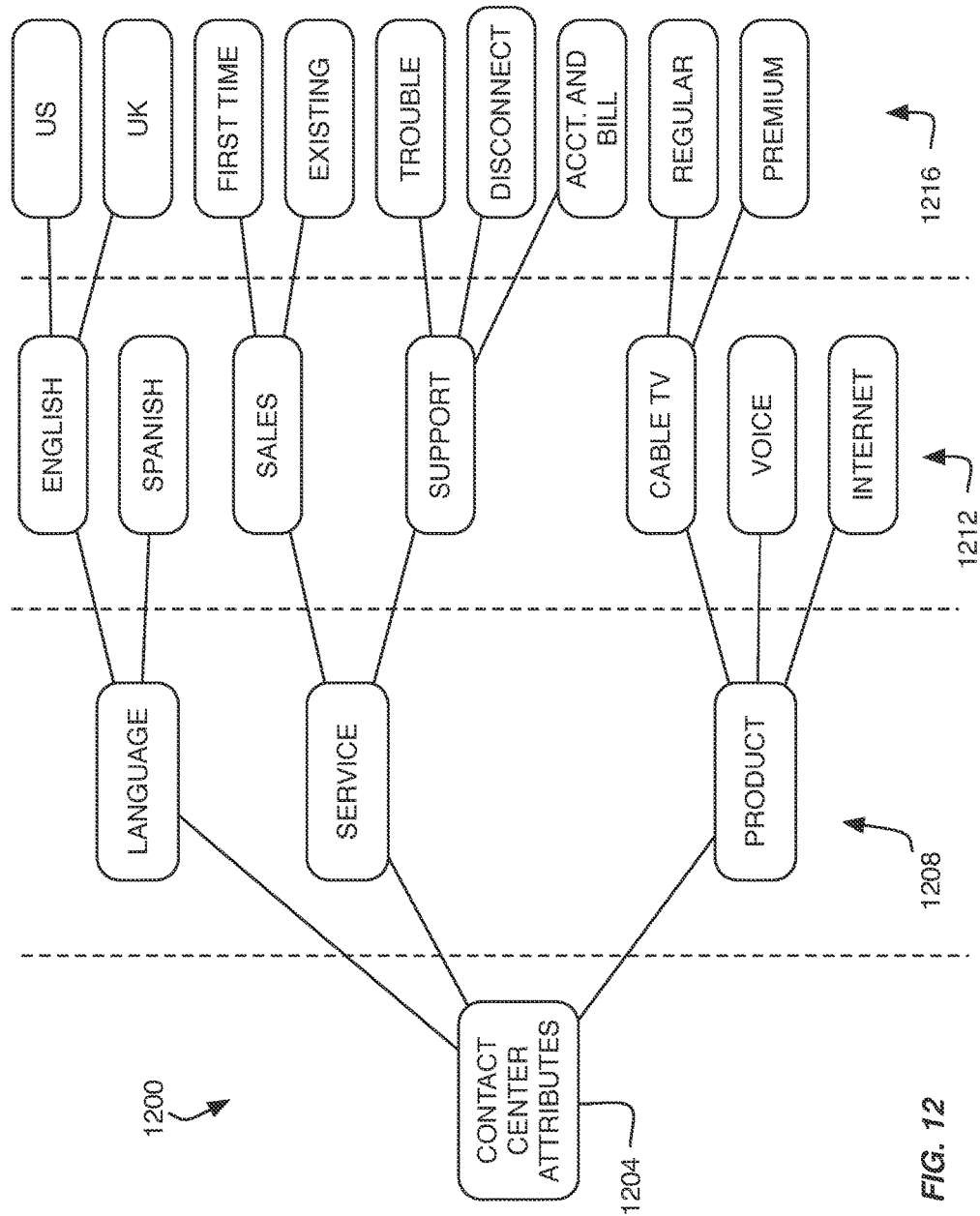
FIG. 12 is a block diagram depicting an attribute tree in accordance with embodiments of the present disclosure.

With reference now to FIG. 12, the utilization of an attribute tree 1200 within a contact center 102 will be described in accordance with at least some embodiments of the present disclosure. The attribute tree 1200 represents a graph database 160 data structure that includes a plurality of data elements describing attributes in the contact center and can be leveraged by the work assignment engine 120 among other contact center 102 components. The attribute tree 1200 is used to define possible and actual resource and/or work item attributes, which are traditionally referred to as skills or processing requirements. In the past, the contact center administrator would have to pre-define a new attribute set for every possible or actual attribute combination in the contact center 102. As can be appreciated, as the number of attributes supported in the contact center 102 expanded, the number of attribute sets would expand exponentially. The attribute tree 1200 solves this scaling problem in a contact center 102 by providing a simple and elegant data structure that allows attributes to be defined in a logical manner and allows an infinite combination of attribute sets to be defined for any resource and/or work item without having to pre-define such attribute combinations.

In the depicted embodiment, the attribute tree 1200 corresponds to a graph database data structure where nodes are attributes and the relationships between the nodes correspond to weights needed to traverse the relationship and arrive at another node. Alternatively or additionally, the weights needed to traverse a node may be maintained as a property of the node rather than a property of a relationship. Another advantage of the attribute tree 1200 is that the work assignment engine 120 can utilize proximity-based routing techniques to make a best possible match between a resource and work item even when the resource may not have the exact attribute combination required to process the work item.

The attribute tree 1200 is shown to include a base node 1204 that is connected to a first tier of nodes 1208. The first tier of nodes 1208 are connected to a second tier of nodes 1212, which are connected to a third tier of nodes 1216, and so on. Although the attribute tree 1200 is only shown to include three tiers of nodes, it should be appreciated that attribute trees of much greater depth having a much larger number of tiers may be utilized. The simple attribute tree 1200 is depicted for ease of understanding the present disclosure.

In the depicted example, the first tier of nodes 1208 may correspond to a highest level of attributes or skills in the contact center 102 (e.g., language, service, product, etc.). The natures and types of nodes in any tier of the attribute tree 1200 can be defined by the provider of the contact center 102 or by a user of the contact center (e.g., manager or administrator). Depending upon the needs and services provided by the contact center, the types of nodes in the first tier of nodes 1208 will likely vary from those depicted in FIG. 12.

The second tier of nodes 1212 corresponds to the sub-nodes connected to the first tier of nodes 1208. The illustrated examples of nodes in the second tier of nodes 1212 include English, Spanish, etc. (as sub-nodes to the language node); sales, support, etc. (as sub-nodes to the service node); and cable TV, voice, Internet (as sub-nodes to the product node). In this particular example, the contact center 102 using this particular attribute tree 1200 may correspond to a Internet, phone, and cable provider (e.g., a network provider) and the various categories of attributes in the second tier of nodes 1212 may define the types of services specifically handled within the contact center 102.

The third tier of nodes 1216 corresponds to the sub-nodes connected to the second tier of nodes 1212. The illustrated examples of nodes in the third tier of nodes 1216 include US, UK, etc. (as sub-nodes to the English language node); first time, existing, etc. (as sub-nodes to the sales node); troubleshooting, disconnect, accounts and billing, etc. (as sub-nodes to the support node); and regular, premium, etc. (as sub-nodes to the cable TV node). It should be appreciated that the other nodes in the second tier of nodes 1212 may or may not have sub-nodes defined therefor. Additional details of the attribute tree 1200 will be described in connection with the work assignment engine 120 and its operation.

Figure 13:
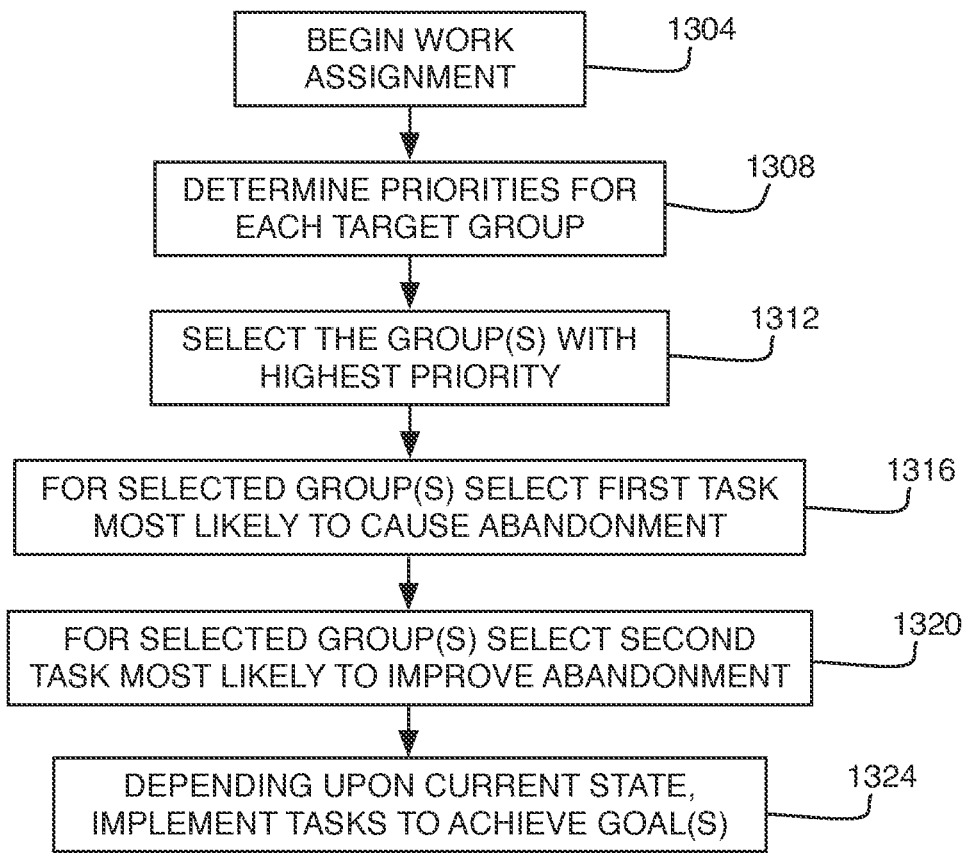
FIG. 13 is a flow diagram depicting a first work assignment method in accordance with embodiments of the present disclosure.

With reference now to FIG. 13, a work assignment method will be described in accordance with embodiments of the present disclosure. The method begins at step 1304, for example when a work item is created in the contact center 102 or when a resource becomes available. Once the work assignment process begins, the priorities for each target group are determined by the work assignment engine 120 (step 1308) and the group(s) with the highest priorities are selected for supporting the work assignment decision (step 1312). In some embodiments, a contact center administrator or manager may define the priorities of target groups (e.g., highest priority is profit, second highest priority is abandon rate, third highest priority is ASA, etc.) and the priorities can be customizable and changed as needed during operation of the contact center 102. To continue this particular example, assume that abandonment or abandon rate is selected as the group with the highest priority (e.g., minimize abandon rate).

The method continues by selecting the first task most likely to impact the selected highest priority group (e.g., tasks likely to cause abandonment) (step 1316) as well as the tasks most likely to improve abandonment (step 1320). In this example, adding more resources to the pool of available resources (e.g., bringing in external resources) may help to improve abandonment whereas re-assigning resources to other tasks may cause abandonment. Depending upon the current state of the contact center, the work assignment engine 120 will implement the tasks identified in steps 1316 and 1320 to drive the contact center behavior toward the desired goal for the highest priority group (step 1324). As mentioned above, the work assignment engine 120 can attempt to satisfy the abandonment goals by using the attribute tree 1200 during work assignment decisions. If abandons are directly related to estimated wait time, then the work assignment engine 120 may loosen its matching logic to allow greater traversal of the attribute tree 1200 during a work assignment decision. In other words, the work assignment engine 120 may not require a perfect match between a work item processing requirement (as defined by attributes in the attribute tree 1200) and a resource's skills (as defined by attributes in the attribute tree 1200). Instead, a "good enough" agent can be selected based on the agent's proximity to the required attributes in the attribute tree 1200.

Figure 14A:
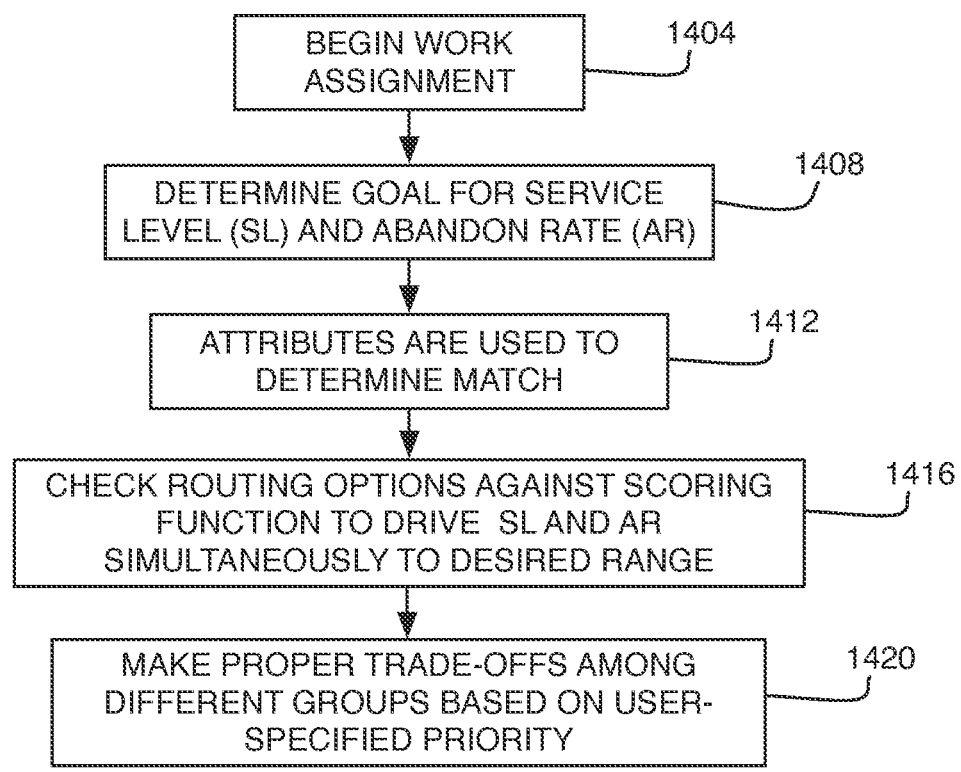
FIG. 14A is a flow diagram depicting a second work assignment method in accordance with embodiments of the present disclosure.
Figure 14B:
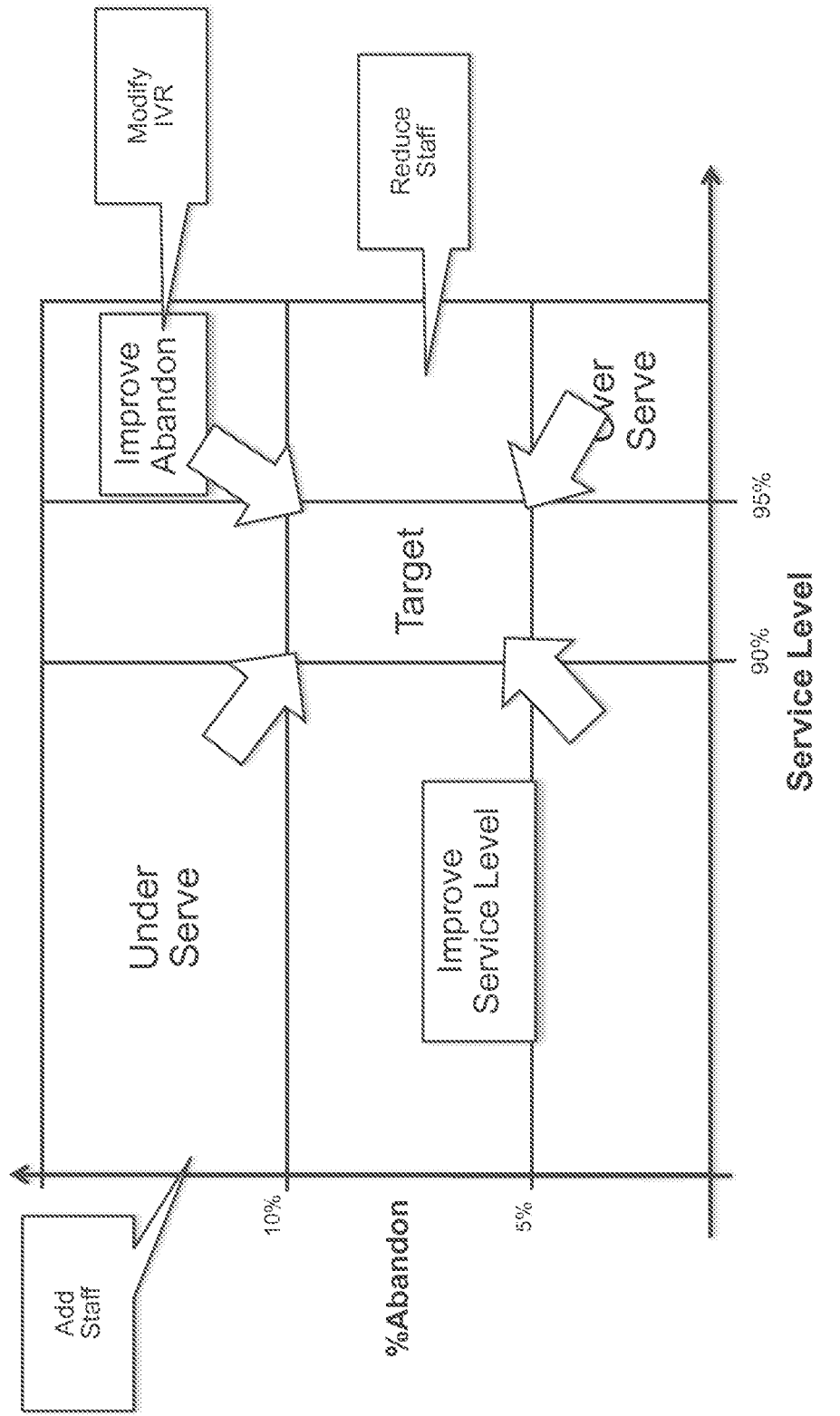
FIG. 14B is a user interface depicting the status of multiple objectives in accordance with embodiments of the present disclosure.

With reference now to FIGS. 14A and 14B a work assignment method for simultaneously satisfying two or more goals will be described in accordance with at least some embodiments of the present disclosure. The goals trying to be satisfied in this particular method may or may not be compatible (e.g., driven to an optimal value by the movement of metrics in the same direction). One example of incompatible goals may include maximizing profits and maximizing customer satisfaction. Another example of incompatible goals may include obtaining a target service level and obtaining a target abandon rate. While these goals may be compatible, it is more likely than not that satisfaction of one goal (e.g., service level) may negatively impact satisfaction of the other goal (e.g., abandon rate). The method begins when the work assignment engine 120 is engaged (step 1404) and work items begin flowing into the contact center. Prior to initiating the work assignment engine 120, the targets or target ranges for the two or more goals may be identified and provided to the work assignment engine 120 (step 1408).

The work assignment engine 120 uses the targets defined for the two or more goals to guide its work assignment decisions and the attribute tree 1200 can be used to match work items with resources (step 1412). In particular, the work assignment engine 120 is allowed to check all possible assignment decisions for a work item and/or resource against a scoring function to drive the two or more goals (e.g., service level and abandon rate) simultaneously toward a desired range (step 1416). Because the work assignment engine 120 is aware of the multiple goals and has the ability to traverse the attribute tree 1200 to make softer work assignment decisions (e.g., decisions that are not limited to a defined set of attribute combinations), the work assignment engine 120 is allowed to make the proper trade-offs among different groups based on the user-specified priorities of the goals (step 1420).

As depicted in FIG. 14B, one of the goals may be represented on one axis of a viewable graph and the other goal may be represented on another axis of the graph. The matrix created thereby may correspond to contact center states where the center square in the matrix represents a state where both goals are being satisfied (e.g., metrics are within target ranges for both goals). The work assignment engine 120 may be configured to make work assignment decisions such that if the contact center 102 is not in the targeted center square, then behavior of the contact center 102 is adjusted to drive the behavior toward the targeted center square where service level is not too high or too low and abandon rate is not too high or too low. Specifically, if service levels are too high, then the work assignment engine 120 can try to reduce staffing, thereby bringing the service level back within the target range. Likewise, if abandon rate is getting too high, then the work assignment engine 120 may add more resources to the pool of available resources or the work assignment engine 120 may loosen its restrictions on work assignment requirements (e.g., allowing a larger traversal of the attribute tree 1200 to find a resource match for a work item).

Figure 15A:
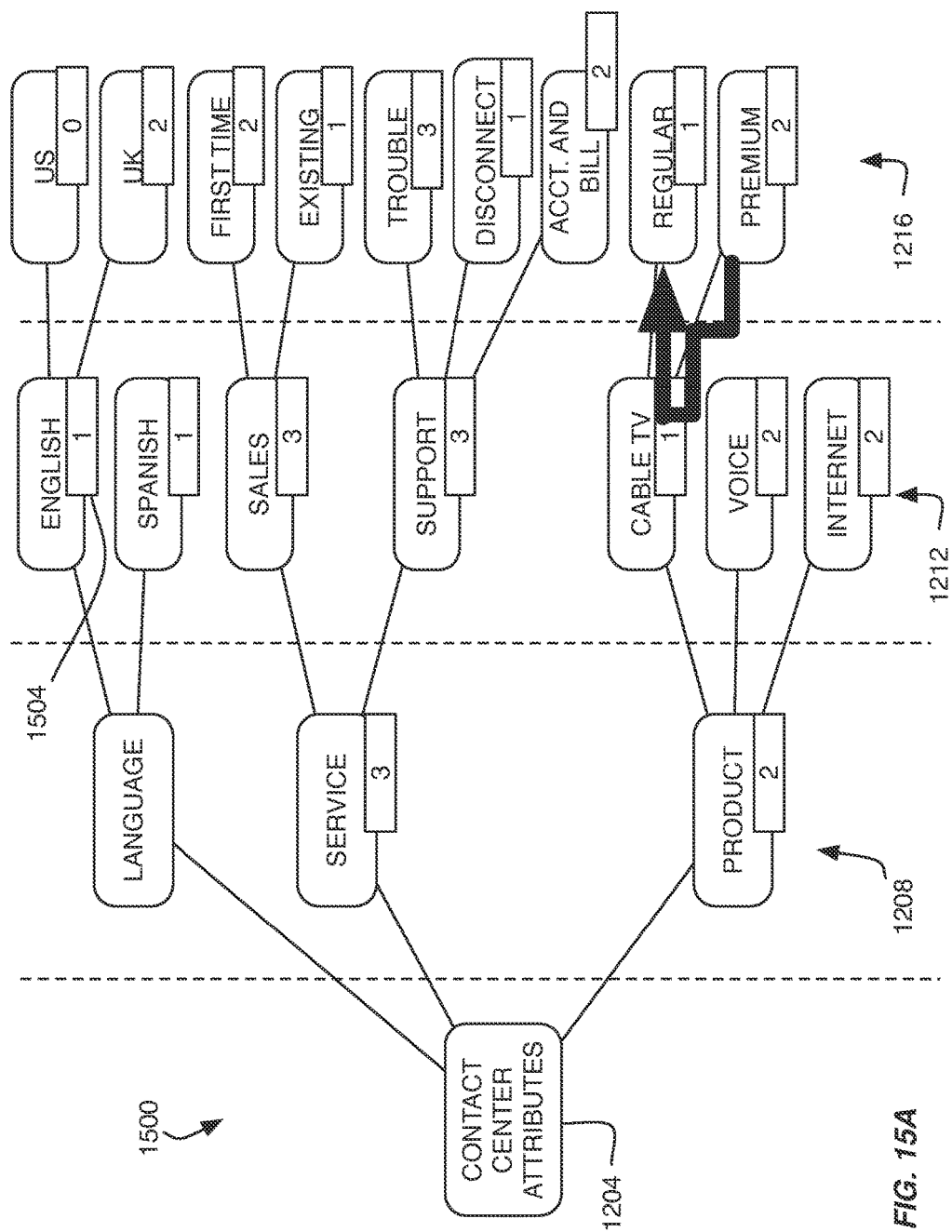
FIG. 15A is a block diagram showing a method of traversing an attribute tree in connection with making a work assignment decision in accordance with embodiments of the present disclosure.
Figure 15B:
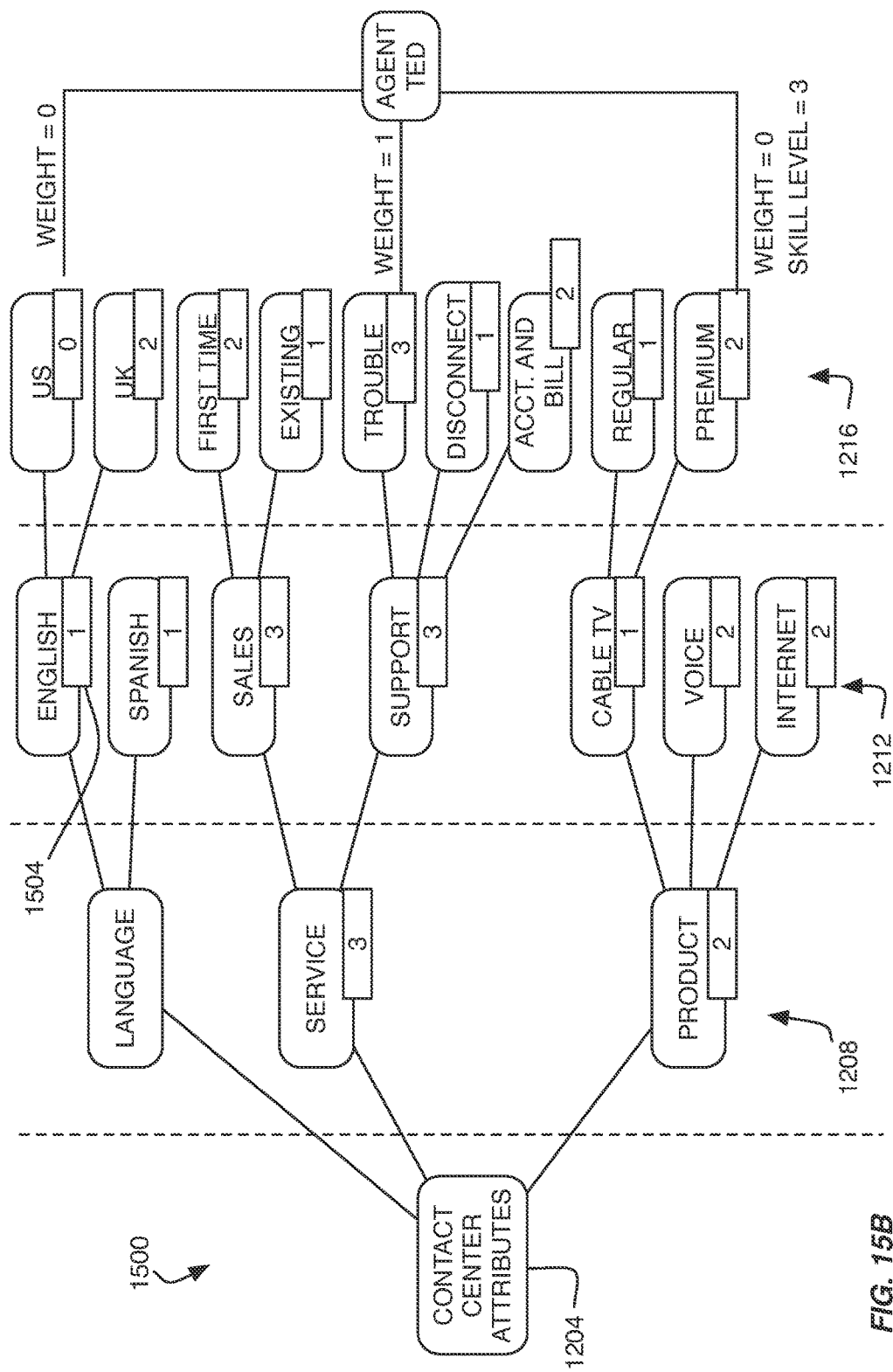
FIG. 15B is a block diagram depicting an agent's particular relationship with an attribute tree in accordance with embodiments of the present disclosure.

With reference now to FIGS. 15A and 15B additional details of an attribute tree 1500 will be described in accordance with embodiments of the present disclosure. The attribute tree 1500 may be similar or identical to the attribute tree 1200 of FIG. 12. The attribute tree 1500 further shows that some or all nodes of the attribute tree 1500 may comprise weights or traversal values 1504. These weights may provide the work assignment engine 120 with a mechanism for determining whether a particular resource can be assigned to a particular work item. For example, a work item may comprise a language attribute of English:UK. If the work assignment engine 120 determines that no available resource comprises exactly the right language requirement that matches the work item's language attribute, then the work assignment engine 120 may look for a best available second option. This search may involve the work assignment engine 120 traversing the attribute tree 1500 up and down nodes until a node is found having an available resource connected thereto. Continuing the above example, if an available resource has a language attribute of English:US, then the work assignment engine may be allowed to assign the work item to the resource by traversing the attribute tree 1500 from the English:UK node to the English node and then to the English:US node. The traversal value 1504 for moving from the English:US to English node may be one point and then the traversal value 1504 for moving form the English to the English:UK node may be two points. In this example, the work assignment engine will negatively weight the decision to assign the work item to the resource having the English:US attribute by a total of three points. This may be considered an allowable, but less than optimal work assignment decision; however, in the face of increasing wait times and risk of abandonment, the work assignment engine 120 may be allowed to make the less than optimal work assignment decision. The traversal values 1504 can be utilized to control how flexible the work assignment engine 120 can be in making its decisions.

The attribute tree 1500, therefore, represents a hierarchical organization of attributes in the contact center 102 and can be used for matching in a flexible manner. The attribute tree 1500 eliminates the need for pre-defined attribute sets and allows the naturally defined relationships to simplify proximity determinations. Moreover, there is no need to group the attributes into sets for matching and reporting.

A single attribute tree 1500 can be defined in the graph database 160 and as resources and/or work items are added to the contact center 102, the skill levels or processing requirements for the resources/work items can be defined by connecting the nodes of the resource/work item to the nodes in the attribute tree. FIG. 15B shows how an illustrative agent (e.g., agent Ted) has his skill levels defined by having the agent's node connected to the appropriate nodes in the attribute tree 1500. If the agent has a particular skill, then that agent's node is connected to the corresponding node in the attribute tree 1500 and a weight can be assigned to the relationship between the agent node and the node in the attribute tree 1500. Likewise, although not shown, the work item or contact node can be connected to nodes within the attribute tree 1500. This means that the work assignment engine 120 only has to traverse the attribute tree 1500 from the work item to the closest resource to identify a best or a good enough match for the work item. If multiple resources have the same skills and are connected to the same nodes in the attribute tree 1500, then the work assignment engine 120 can continue traversing the nodes in the graph database 160 to identify other parameters suitable for making a work assignment decision (e.g., an idle time (which can be defined by other nodes in the graph database 160) for equally qualified agents may be considered in making the work assignment decision).

In the example of FIG. 15B, agent Ted is shown to have a zero weight for his connections to English:US and premium cable nodes. This may indicate that Ted is completely proficient at handling these particular aspects of a contact. However, thanks to proximity matching enabled by the attribute tree 1500, if a work item has an English:UK attribute and is seeking product information for regular cable TV (as opposed to premium cable TV), agent Ted may still be a viable option to the work assignment engine 120 since the nodes of the attribute tree 1500 that have to be traversed are not that significant and the traversal values 1504 to get to such nodes are relatively low. If, however, a work item has an attribute of Spanish, the work assignment engine 120 may not be able to assign the work item to agent Ted because the traversal of the attribute tree from English to Spanish is not allowed (due to no traversal value 1504 at the language node). Other nodes in the first tier of nodes 1208 may be traversed, however, as indicated by the traversal values of service node and product node.

Figure 16A:
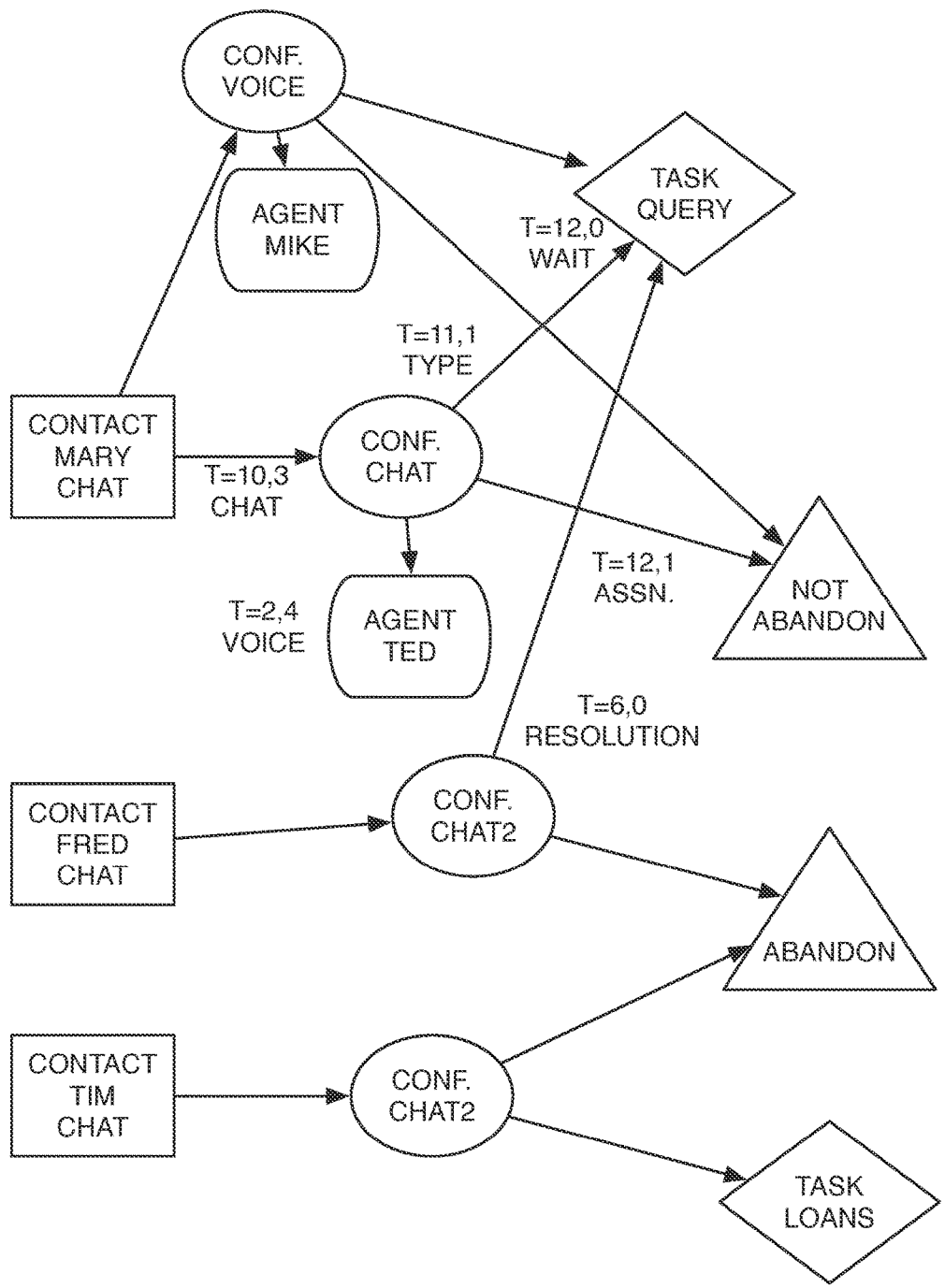
FIG. 16A is a first graph representation of multiple contacts and work items in a contact center in accordance with embodiments of the present disclosure.
Figure 16B:
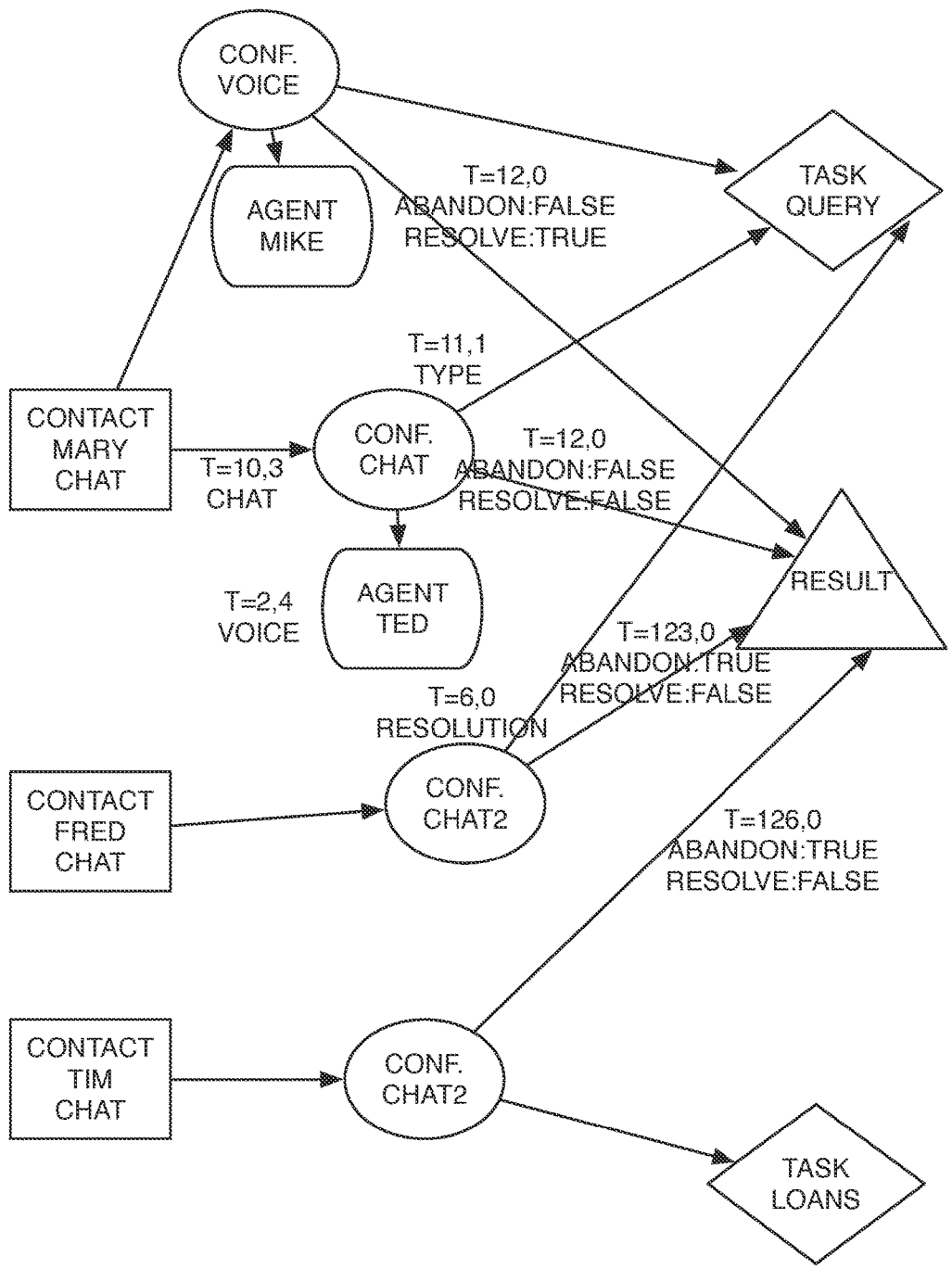
FIG. 16B is a second graph representation of multiple contacts and work items in a contact center in accordance with embodiments of the present disclosure.

FIGS. 16A and 16B depicts additional details of data structures in a graph database 160 of a contact center 102. As discussed herein, the utilization of a graph database 160 is flexible and can be modified to accommodate any number of contact center conditions. The data structure of FIG. 16A shows how contact nodes can be connected to multiple different conference nodes and conference nodes of different customers can be connected to a common resolution node. In the depicted example, the conference nodes that are connected to Mary's contact node may both be connected to a not abandoned resolution node. The conference node that is connected to Fred's contact node may be connected to an abandoned resolution node. The conference node that is connected to Tim's contact center may also be connected to the abandoned resolution node. This is useful as the contact center 102 continues to operate and more contact nodes are created. Specifically, a single reporting node can be created and connected to the appropriate nodes in the graph database 160 to generate a report on failed resolutions (e.g., to determine abandons, source of abandons, etc.).

FIG. 16B shows another possible representation in a graph database 160 of the same scenario depicted in FIG. 16A, except that the graph database 160 does not have specific abandon and not abandoned resolution nodes. Instead, all conference nodes are connected to a common result node and the relationships between the conference nodes and the common result node show whether the result was abandonment or not. In other words, it should be appreciated that embodiments of the present disclosure are not limited to the particular graph database configurations depicted and described herein. To the contrary, embodiments of the present disclosure contemplate any configuration of graph database nodes and/or relationships to describe the operation of a contact center. Moreover, the graph database can be expanded to include an attribute tree and other data structures that support operations of other contact center components. By incorporating these data structures into a common database and data schema, the operations of the contact center 102 are vastly improved as compared to the prior art and the previously incompatible components can operate in a seamless manner.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
maintaining, by a contact center, a model of the contact center, the model of the contact center comprising a plurality of data elements of a graph database, the graph database storing the plurality of data elements without a fixed schema, the plurality of data elements including a plurality of nodes, each node having one or more attributes defining at least one relationship with at least one other node of the plurality of nodes, and wherein each node represents at least one of a work item of the contact center, a contact of the contact center, a resource of the contact center, a conference in the contact center, or an event of the contact center;
receiving a contact in the contact center;
creating a contact node in the graph database that is representative of the contact;
connecting the contact node to a conference node and a work item node in the graph database, the conference node being representative of the contact's interaction with the contact center and the work item node being representative of a work item to be processed by the contact center in connection with resolving the contact;
identifying one or more processing requirements associated with the work item;
using a work assignment engine to search the graph database for one or more nodes representing resources that possess or nearly possess an attribute that satisfied the one or more processing requirements associated with the work item;
selecting a first resource for assignment to the work item based on searching the graph database; and
creating one or more attributes defining a relationship in the graph database that connects the conference node to a node representing the first resource, thereby signifying that the first resource has been assigned to the work item.

2. The method of claim 1, further comprising:
allowing the work assignment engine to traverse nodes of an attribute tree maintained in the graph database to make a proximity-based work assignment decision for the work item.

3. The method of claim 2, wherein the first resource does not possess every attribute required to satisfy the one or more processing requirements.

4. The method of claim 3, wherein the first resource is connected to a first node in the attribute tree, wherein the contact node is connected to a second node in the attribute tree that is different from the first node, and wherein at least one relationship either directly or indirectly connects the first node with the second node.

5. The method of claim 4, wherein the work assignment engine identifies costs associated with assigning the work item to the first resource by traversing the nodes of the attribute tree from the first node to the second node and summing traversal values associated with traversing the nodes of the attribute tree.

6. The method of claim 1, wherein the relationship that connects the conference node to the node representing the first resource comprises a property identifying when the first resource is assigned to the work item.

7. The method of claim 6, wherein the relationship that connects the conference node to the node representing the first resource further comprises a property identifying how long the first resource takes to process the work item.

8. The method of claim 1, wherein the work assignment engine writes information to the graph database reflecting that the first resource has been assigned to the work item.

9. A contact center, comprising:
a processor; and
a memory coupled with and readable by the processor and storing therein a set of instructions which, when executed by the processor, cause the processor to assign work items in the contact center by:
maintaining a model of the contact center, the model of the contact center comprising a plurality of data elements of a graph database, the graph database storing the plurality of data elements without a fixed schema, the plurality of data elements including a plurality of nodes, each node having one or more attributes defining at least one relationship with at least one other node of the plurality of nodes, and wherein each node represents at least one of a work item of the contact center, a contact of the contact center, a resource of the contact center, a conference in the contact center, or an event of the contact center;
receiving a contact in the contact center;
creating a contact node in the graph database that is representative of the contact;
connecting the contact node to a conference node and a work item node in the graph database, the conference node being representative of the contact's interaction with the contact center and the work item node being representative of a work item to be processed by the contact center in connection with resolving the contact;

identifying one or more processing requirements associated with the work item;

using a work assignment engine to search the graph database for one or more nodes representing resources that possess or nearly possess an attribute that satisfied the one or more processing requirements associated with the work item;

selecting a first resource for assignment to the work item based on searching the graph database; and creating one or more attributes defining a relationship in the graph database that connects the conference node to a node representing the first resource, thereby signifying that the first resource has been assigned to the work item.

10. The contact center of claim 9, wherein the first node is connected directly to the second node via a first relationship.

11. The contact center of claim 10, wherein the first relationship comprises one or more properties that describe when the work assignment engine assigned the work item to the resource.

12. The contact center of claim 11, wherein the first relationship further comprises a property that describes an amount of time during which the resource was connected to the work item.

13. The contact center of claim 9, wherein the first node is indirectly connected to the second node via at least two relationships and at least a third node of the graph database.

14. The contact center of claim 13, wherein the third node comprises a conference node to which both the first node and the second node are directly connected.

15. The contact center of claim 9, wherein the data storage medium further comprises an attribute tree that is used by the work assignment engine to match the work item with the resource.

16. The contact center of claim 15, wherein the attribute tree comprises a plurality of nodes, each of which describe different attributes in the contact center and wherein the second node associated with the resource is connected to at least one node in the attribute tree to describe attributes of the resource for reference by the work assignment engine.

17. The contact center of claim 15, wherein the attribute tree enables the work assignment engine to make proximity-based work assignment decisions.

18. The contact center of claim 9, wherein the work assignment engine writes information to the graph database reflecting that the resource has been assigned to the work item.

19. A non-transitory computer-readable medium comprising processor-executable instruction that, when executed by a processor, perform a method that comprises:

maintaining, by a contact center, a model of the contact center, the model of the contact center comprising a plurality of data elements of a graph database, the graph database storing the plurality of data elements without a fixed schema, the plurality of data elements including a plurality of nodes, each node having one or more attributes defining at least one relationship with at least one other node of the plurality of nodes, and wherein each node represents at least one of a work item of the contact center, a contact of the contact center, a resource of the contact center, a conference in the contact center, or an event of the contact center;

receiving a contact in the contact center;

creating a contact node in the graph database that is representative of the contact;

connecting the contact node to a conference node and a work item node in the graph database, the conference node being representative of the contact's interaction with the contact center and the work item node being representative of a work item to be processed by the contact center in connection with resolving the contact;

identifying one or more processing requirements associated with the work item;

using a work assignment engine to search the graph database for one or more nodes representing resources that possess or nearly possess an attribute that satisfied the one or more processing requirements associated with the work item;

selecting a first resource for assignment to the work item based on searching the graph database; and creating one or more attributes defining a relationship in the graph database that connects the conference node to a node representing the first resource, thereby signifying that the first resource has been assigned to the work item.

20. The non-transitory computer-readable medium of claim 19, wherein the relationship that connects the conference node to the node representing the first resource comprises a property identifying when the first resource is assigned to the work item.

* * * * *